(12) United States Patent
Sakurabu

(10) Patent No.: US 9,357,205 B2
(45) Date of Patent: May 31, 2016

(54) STEREOSCOPIC IMAGE CONTROL APPARATUS TO ADJUST PARALLAX, AND METHOD AND PROGRAM FOR CONTROLLING OPERATION OF SAME

(71) Applicant: FUJIFILM Corporation, Minato-ku, Tokyo (JP)

(72) Inventor: Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 564 days.

(21) Appl. No.: 13/689,040

(22) Filed: Nov. 29, 2012

(65) Prior Publication Data

US 2013/0083174 A1 Apr. 4, 2013

Related U.S. Application Data

(63) Continuation-in-part of application No. PCT/JP2011/060496, filed on Apr. 22, 2011.

(30) Foreign Application Priority Data

May 31, 2010 (JP) ................................. 2010-123669

(51) Int. Cl.
*H04N 13/04* (2006.01)
*H04N 13/00* (2006.01)
*H04N 13/02* (2006.01)

(52) U.S. Cl.
CPC ........... *H04N 13/04* (2013.01); *H04N 13/0022* (2013.01); *H04N 13/0029* (2013.01); *H04N 13/0239* (2013.01)

(58) Field of Classification Search
None
See application file for complete search history.

(56) References Cited

U.S. PATENT DOCUMENTS 6,762,794 B1 * 7/2004 Ogino ................... G06T 7/0022
348/262
2005/0271303 A1 * 12/2005 Simpson ............ G02B 27/2228
382/305

(Continued)

FOREIGN PATENT DOCUMENTS

CN 100496097 C 6/2009
CN 101562754 A 10/2009

(Continued)

OTHER PUBLICATIONS

Notification of First Office Action, dated Sep. 3, 2014, issued in corresponding CN Application No. 201180027164.8, 18 pages in English and Chinese.

*Primary Examiner* — Dave Czekaj
*Assistant Examiner* — Tyler W Sullivan
(74) *Attorney, Agent, or Firm* — Sughrue Mion, PLLC

(57) ABSTRACT

A natural stereoscopic image is displayed and eye strain is mitigated. A face image is detected in a stereoscopic image composed of a left-eye image and a right-eye image. The left-eye and right-eye images are shifted in such a manner that visual disparity of the detected face image is removed. Furthermore, a display area containing the face image is calculated. The calculated display area is enlarged so as to be displayed over the entirety of the display screen. Since a double image that appears in front of the face image is excluded, the strain upon the eyes of the observer is mitigated.

6 Claims, 36 Drawing Sheets

(56) References Cited

U.S. PATENT DOCUMENTS

| | | | |
|---|---|---|---|
| 2006/0193509 A1* | 8/2006 | Criminisi | G06K 9/00241 382/154 |
| 2009/0060280 A1* | 3/2009 | Choi | G06T 7/0075 382/106 |
| 2009/0153649 A1* | 6/2009 | Hirooka | H04N 5/23212 348/47 |
| 2010/0091097 A1* | 4/2010 | Pockett | H04N 13/0018 348/54 |
| 2010/0289877 A1* | 11/2010 | Lanfranchi | G02B 27/2207 348/46 |
| 2011/0080466 A1* | 4/2011 | Kask | G06T 7/0022 348/43 |
| 2012/0242803 A1* | 9/2012 | Tsuda | H04N 13/0022 348/46 |

FOREIGN PATENT DOCUMENTS

| | | |
|---|---|---|
| EP | 1087336 A2 | 3/2001 |
| JP | 8-317429 A | 11/1996 |
| JP | 2001-004370 A | 1/2001 |
| JP | 2001-148800 A | 5/2001 |
| JP | 2004-129186 A | 4/2004 |
| JP | 2007-307225 A | 11/2007 |
| JP | 2008-022150 A | 1/2008 |
| JP | 2009-129420 A | 6/2009 |
| WO | 2009157707 A2 | 12/2009 |

* cited by examiner

*Fig. 1*
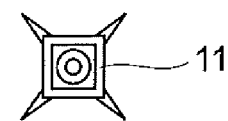
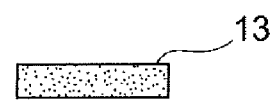
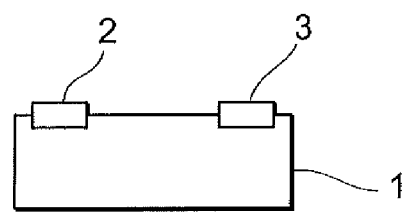

Fig. 3
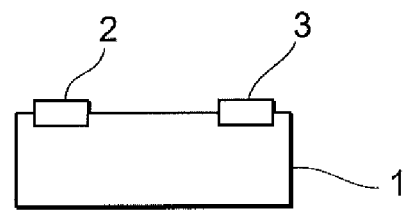

*Fig. 10*
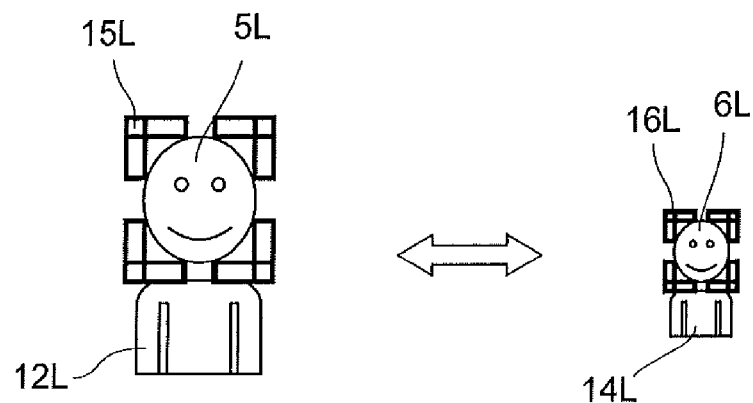
*Fig. 11*
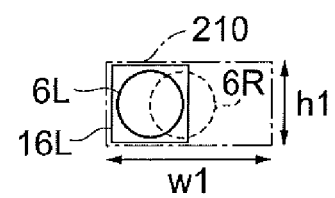
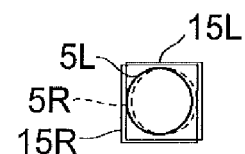
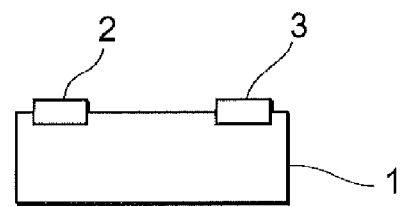

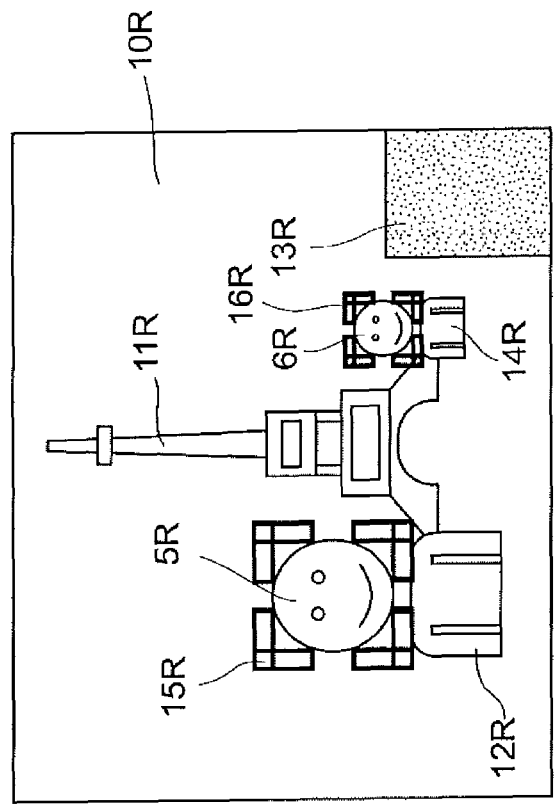
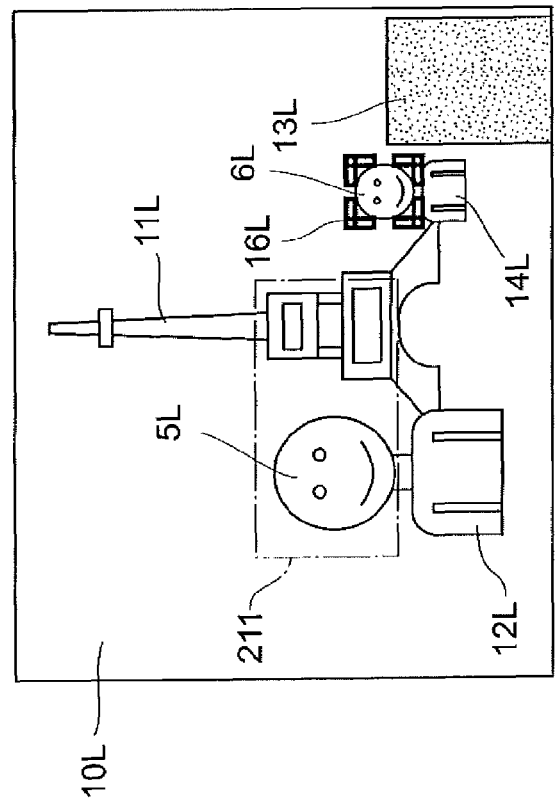

*Fig. 13*
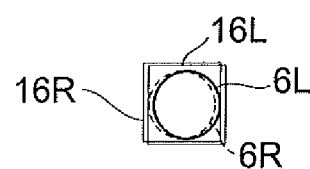
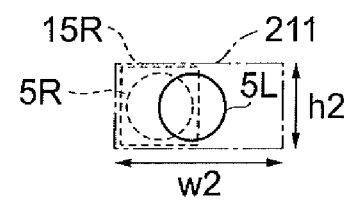
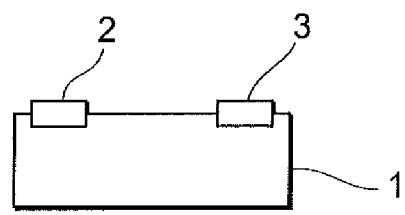

*Fig. 15*
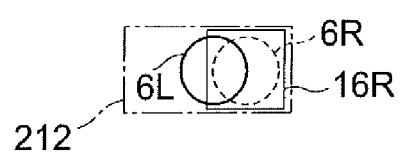
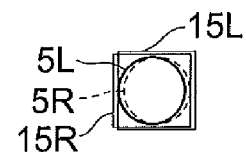
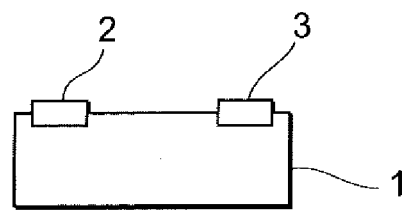

*Fig. 17*
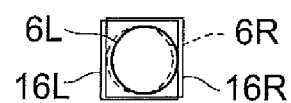
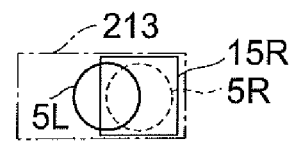
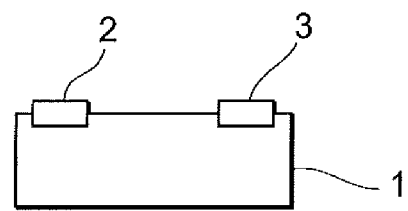

– 1 –

STEREOSCOPIC IMAGE CONTROL APPARATUS TO ADJUST PARALLAX, AND METHOD AND PROGRAM FOR CONTROLLING OPERATION OF SAME

TECHNICAL FIELD

This invention relates to a stereoscopic image control apparatus and to a method and program for controlling the operation of this apparatus.

BACKGROUND ART

An apparatus for displaying a stereoscopic image has been developed (Japanese Patent Application Laid-Open No. 2008-22150). There is an arrangement which, in such a stereoscopic image display apparatus, is for adjusting parallax for every portion of a subject included in the stereoscopic image (Japanese Patent Application No. 2007-307225). Further, there is also a digital camera for extracting a region of interest (Japanese Patent Application Laid-Open No. 2001-148800) and a parallax image capture apparatus for acquiring multiple depth values of a subject brought into view by superimposing of a plurality of objects (Japanese Patent Application Laid-Open No. 2001-4370).

In a stereoscopic image, it is necessary to arrange it so that there will no parallax between certain image portions that are common to both the left-eye and right-eye images that constitute the stereoscopic image. Conventionally, although it is arranged so that there is no parallax between the approximate central portions of respective ones of the left-eye and right-eye images, there are instances where the stereoscopic image displayed will appear unnatural.

DISCLOSURE OF THE INVENTION

An object of the present invention is to obtain a comparatively natural stereoscopic image.

A stereoscopic image control apparatus according a first aspect of the present invention comprises: a first object image portion detection device (first object image portion detection means) for finding a desired object image portion from a left-eye image (an image for left eye) and from a right-eye image (an image for right eye) constituting a stereoscopic image; a parallax shifting device (parallax shifting means) for shifting the left-eye image and the right-eye image in such a manner that visual disparity between the object image portion of the left-eye image and the object image portion of the right-eye image, which have been found in the first object image portion detection device, is removed; a display area decision device (display area decision means) for deciding a display area, which contains the object image portion the visual disparity of which has been removed by the parallax shifting device, in the left-eye image and right-eye image that have been shifted by the parallax shifting device; and a display control device (display control means) for controlling a display unit so as to enlarge and display the image within the display area, which has been decided by the display area decision device, in the left-eye image and right-eye image that have been shifted by the parallax shifting device.

The first aspect of the present invention also provides a method of controlling the operation of the above-described stereoscopic image control apparatus. Specifically, the method comprises: an object image portion detection device finding desired object image portions from a left-eye image and from a right-eye image constituting a stereoscopic image; a parallax shifting device shifting the left-eye image and the right-eye image in such a manner that visual disparity between the object image portion of the left-eye image and the object image portion of the right-eye image, which have been found in the object image portion detection device, is removed; a display area decision device deciding a display area, which contains the object image portion the visual disparity of which has been removed by the parallax shifting device, in the left-eye image and right-eye image that have been shifted by the parallax shifting device; and a display control device controlling a display unit so as to enlarge and display the image within the display area, which have been decided by the parallax shifting device, in the left-eye image and right-eye image that have been shifted by the parallax shifting device.

The first aspect of the present invention also provides an operation program for implementing the method of controlling the operation of the above-described stereoscopic image control apparatus. Furthermore, it may be arranged so that a recording medium on which such an operation program has been stored is also provided.

In accordance with the first aspect of the present invention, desired object image portions are found from respective ones of a left-eye image and a right-eye image constituting a stereoscopic image. A parallax shift is performed between the left-eye image and the right-eye image in such a manner that parallax between the object image portion found from the left-eye image and the object image portion found from the right-eye image is removed. A display area (which preferably has a size equal to or greater than a predetermined minimum display size and smaller than the size of the stereoscopic image) containing the object image portion the visual disparity of which has been removed is decided in the left-eye image and in the right-eye image. A display device is controlled in such a manner that the image within the display area decided will be enlarged and displayed.

The parallax shift is not performed so as to simply eliminate visual disparity between the central portion of the left-eye image and the central portion of the right-eye image but is instead carried out so as to eliminate the visual disparity of a desired object image portion noticed by the observer. Since a desired object image portion noticed by the observer has no visual disparity, a natural stereoscopic image is obtained. Furthermore, since the display area that contains such an object image portion is decided and the image within the decided object image portion is enlarged and displayed, an image portion outside the display area is not displayed. In a stereoscopic image display, a subject image representing a subject that is in front develops a large visual disparity owing to the effects of aberration of imaging lenses included in the device that captured the image, and the strain upon the eyes is great. However, since the image portion outside the display area is not displayed, the strain upon the eyes of the observer can be mitigated.

The apparatus may further comprise: a first determination device (first determination means) for determining whether a forward subject image (forward double image) representing a subject present in front of the object represented by the object image portion detected by the first object image portion detection device is contained in the left-eye image and in the right-eye image; and a second determination device (second determination means), responsive to a determination made by the first determination device that the forward subject image is contained in the left-eye image and in the right-eye image, for determining whether amount of disparity between the forward subject image contained in the left-eye image and the forward subject image contained in the right-eye image is outside an allowable range. In this case, the display area decision device decides the image area in accordance with a determination made by the second determination device that the amount of disparity is outside the allowable range.

The apparatus may further comprise: a size determination unit (size determination means) for determining whether the size of an object image portion not found in one image of the left-eye image and right-eye image but found in the other image of the left-eye image or right-eye image is larger than the size of object image portions found from both images of the left-eye image and right-eye image in the first object image portion detection device; and a second object image portion detection device (second object image portion detection means) for finding an object image portion, which was not found from the one image, from the right side of a position that corresponds to the object image portion found in the other image in a case where the size determination device has determined that the size of the object image portion found from the other image is larger than the size of object image portions found from both images of the left-eye image and right-eye image and, moreover, the one image is the left-eye image, or in a case where the size determination device has determined that the size of the object image portion found from the other image is smaller than the size of object image portions found from both images of the left-eye image and right-eye image and, moreover, the one image is the right-eye image, and finding an object image portion, which was not found from the one image, from the left side of a position that corresponds to the object image portion found in the other image in a case where the size determination device has determined that the size of the object image portion found from the other image is larger than the size of object image portions found from both images of the left-eye image and right-eye image and, moreover, the one image is the right-eye image, or in a case where the size determination device has determined that the size of the object image portion found from the other image is smaller than the size of object image portions found from both images of the left-eye image and right-eye image and, moreover, the one image is the left-eye image. In this case, the display area decision device would, by way of example, decide a display area which, in the left-eye image and right-eye image shifted by the parallax shifting device, contains the object image portion the visual disparity of which has been removed by the parallax shifting device, the object image portion found from the other image in the first object image portion detection device, and the object image portion found from the one image in the second object image portion detection device.

The apparatus may further comprise: a third object image portion detection device (second object image portion detection means) for finding an object image portion, which was not found from the one image, from the right side of a position that corresponds to the object image portion found in the other image in a case where the position of an object, which is represented by an object image portion found in the first object image portion detection device only from the other image of the left-eye image and right-eye image, is in front of the position of a subject that corresponds to an image at the central portion of the other image and, moreover, the one image is the left-eye image, or in a case where the position of an object, which is represented by an object image portion found in the first object image portion detection device only from the other image of the left-eye image and right-eye image, is behind the position of a subject that corresponds to an image at the central portion of the other image and, moreover, the one image is the right-eye image, and finding an object image portion, which was not found from the one image, from the left side of a position that corresponds to the object image portion found in the other image in a case where the position of an object, which is represented by an object image portion found in the first object image portion detection device only from the other image of the left-eye image and right-eye image, is in front of the position of a subject that corresponds to an image at the central portion of the other image and, moreover, the one image is the right-eye image, or in a case where the position of an object, which is represented by an object image portion found in the first object image portion detection device only from the other image of the left-eye image and right-eye image, is behind the position of a subject that corresponds to an image at the central portion of the other image and, moreover, the one image is the left-eye image. In this case, the display area decision device would, by way of example, decide a display area which, in the left-eye image and right-eye image shifted by the parallax shifting device, contains the object image portion the visual disparity of which has been removed by the parallax shifting device, the object image portion found from the other image in the first object image portion detection device, and the object image portion found from the one image in the third object image portion detection device.

The apparatus may further comprise a comparison device (comparison means), responsive to presence of a central subject image, which represents a subject that is present in front of the object represented by the object image portion detected by the first object image portion detection device, at central portions of respective ones of the left-eye image and right-eye image, for comparing principal subject likelihood of the central subject image and principal subject likelihood of the object image portion detected by the first object image portion detection device. In this case, by way of example, in response to a determination by the comparison device that the principal subject likelihood of the central image is greater than the principal subject likelihood of the object image portion detected by the first object image portion device, the parallax shifting device shifts the left-eye image and the right-eye image in such a manner that visual disparity between the central subject image of the left-eye image and the central subject image of the right-eye image is removed.

The apparatus may further comprise a display determination device (display determination means) for determining, in response to execution of enlargement display control by the display control device, whether the object image portion found in the left-eye image detection device is not to be displayed; and a parallax shift control device (parallax shift control means), responsive to a determination made by the display determination device that the object image portion found in the left-eye image detection device is not to be displayed, for controlling the parallax shifting device so as to shift the left-eye image and the right-eye image in such a manner that visual disparity between the central portion of the left-eye image and the central portion of the right-eye image is removed.

The apparatus may further comprise a recording control device (recording control means) for recording, on a portable recording medium, left-eye image data representing the left-eye image, right-eye image data representing the right-eye image, data representing a portion the visual disparity of which has been removed by the parallax shifting device and data representing the display area decided by the display area decision device.

In a case where the left-eye image data representing the left-eye image and the right-eye image data representing the right-eye image has been recorded on a portable recording medium, the apparatus may further comprise a recording control device (recording control means) for recording, on the portable recording medium, the data representing the portions the visual disparity of which has been removed by the parallax shifting device and the data representing the display area decided by the display area decision device.

A stereoscopic image control apparatus according a second aspect of the present invention comprises: a stereoscopic image generating device (stereoscopic image generating means) for generating a stereoscopic image by superimposing a left-eye image and a right-eye image; an object image detection device (object image detection means) for finding a desired object image portion from within the stereoscopic image generated by the stereoscopic image generating device; an electronic zoom area designation device (electronic zoom area designation means) for designating an electronic zoom area from within the stereoscopic image generated by the stereoscopic image generating device; a determination device (determination means) for determining whether the object image detected by the object image detection device is contained within the electronic zoom area designated by the electronic zoom area designation device; a parallax shifting device (parallax shifting means), responsive to a determination made by the determination device that the object image is not contained in the electronic zoom area, for shifting the left-eye image and the right-eye image in such a manner that visual disparity of the central portion of the stereoscopic image or the electronic zoom area will be eliminated, and responsive to a determination made by the determination device that the object image is contained in the electronic zoom area, for shifting the left-eye image and the right-eye image in such a manner that visual disparity of the object image detected by the object image detection device will be eliminated; and a display control device (control display means) for enlarging and displaying the image within the electronic zoom area.

The second aspect of the present invention also provides an operation control method suited to the above-described stereoscopic image control apparatus. Specifically, the method comprises: a stereoscopic image generating device generating a stereoscopic image by superimposing a left-eye image and a right-eye image; an object image detection device finding a desired object image portion from within the stereoscopic image generated by the stereoscopic image generating device; an electronic zoom area designation device designating an electronic zoom area from within the stereoscopic image generated by the stereoscopic image generating device; a determination device determining whether the object image detected by the object image detection device is contained within the electronic zoom area designated by the electronic zoom area designation device; a parallax shifting device, responsive to a determination made by the determination device that the object image is not contained in the electronic zoom area, shifting the left-eye image and the right-eye image in such a manner that visual disparity of the central portion of the stereoscopic image or of electronic zoom area is eliminated, and in response to a determination made by the determination device that the object image is contained in the electronic zoom area, shifting the left-eye image and the right-eye image in such a manner that visual disparity of the object image detected by the object image detection device is eliminated; and a display control device enlarging and displaying the image within the electronic zoom area.

The second aspect of the present invention also provides an operation program for implementing the method of controlling the operation of the above-described stereoscopic image control apparatus. Furthermore, it may be arranged so that a recording medium on which such an operation program has been stored is also provided.

In accordance with the second aspect of the present invention, if an object image portion is contained within a designated electronic zoom area, then a parallax shift is performed in such a manner that visual disparity of this object image portion will be eliminated. If an object image portion is not contained within the designated electronic zoom area, then a parallax shift is performed in such a manner that visual disparity of the central portion of the stereoscopic image or electronic zoom area is eliminated. A natural stereoscopic image is thus obtained.

BRIEF DESCRIPTION OF THE DRAWINGS

FIG. 1 illustrates the positional relationship between subjects and a stereoscopic imaging digital camera;

FIG. 3 illustrates the positional relationship between subject images and a stereoscopic imaging digital camera;

FIG. 10 is an example of object image portions that have been detected;

FIG. 11 illustrates the positional relationship between subjects and a stereoscopic imaging digital camera;

FIG. 12a illustrates a left-eye image and FIG. 12b a right-eye image;

FIG. 13 illustrates the positional relationship between subjects and a stereoscopic imaging digital camera;

FIG. 15 illustrates the positional relationship between subjects and a stereoscopic imaging digital camera;

FIG. 17 illustrates the positional relationship between subjects and a stereoscopic imaging digital camera;

BEST MODE FOR CARRYING OUT THE INVENTION

Figure 2B:
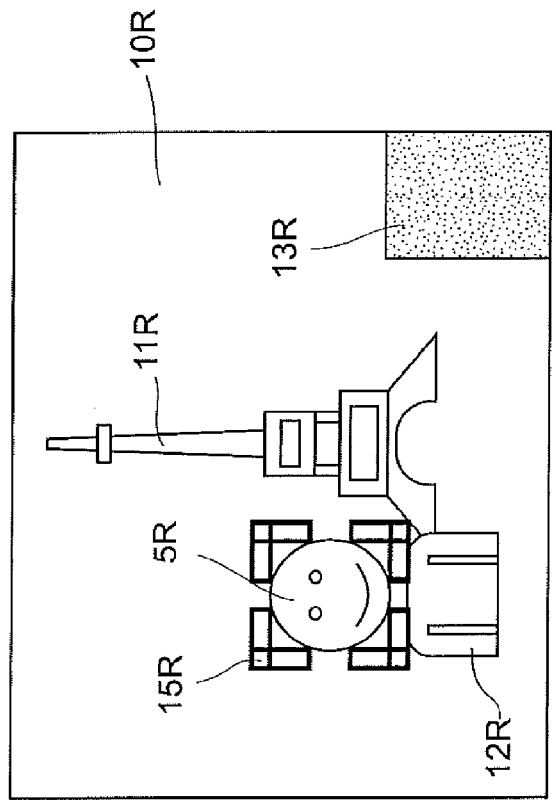
FIG. 2a illustrates a left-eye image and FIG. 2b a right-eye image.

FIG. 1 illustrates an embodiment of the present invention and represents planarly the relationship between a stereoscopic imaging digital camera and subjects.

A stereoscopic imaging digital camera 1 is provided with a first capture device 2 for capturing a left-eye image viewed by the left eye of an observer and with a second capture device 3 for capturing a right-eye image viewed by the right eye of the observer.

A tower 11, person 12 and wall 13 are present in front of the stereoscopic imaging digital camera 1 in order of decreasing distance from the stereoscopic imaging digital camera 1.

Figure 2A:
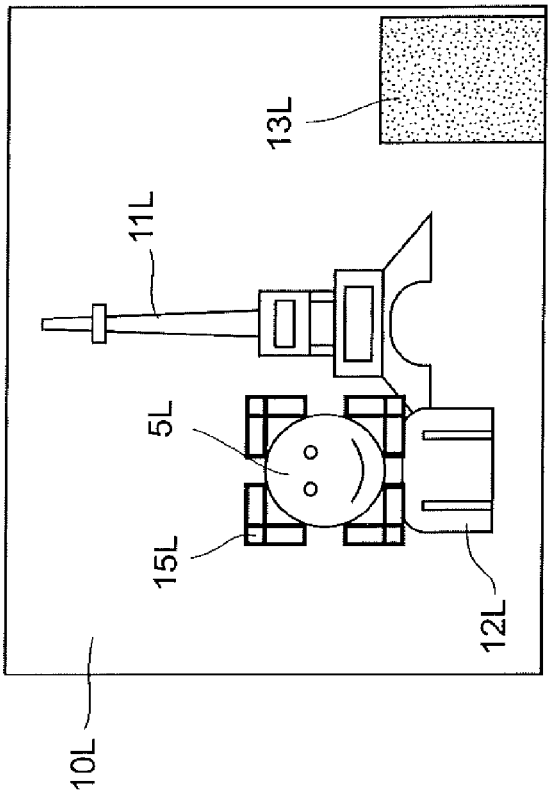

FIGS. 2a and 2b represent a left-eye image and a right-eye image, respectively, obtained by imaging using the stereoscopic imaging digital camera 1 shown in FIG. 1.

A left-eye image 10L shown in FIG. 2a has been captured by the first capture device 2 of the stereoscopic imaging digital camera 1. A right-eye image 10R shown in FIG. 2b has been captured by the second capture device 3 of the stereoscopic imaging digital camera 1.

With reference to FIG. 2a, a tower image 11L corresponding to the centrally located tower 11 is being displayed in the left-eye image 10L. A person image 12L corresponding to the person 12 is being displayed on the left side of the tower image 11L. A wall image 13L corresponding to the wall 13 is being displayed at the lower right corner of the left-eye image 10L.

With reference to FIG. 2b, a tower image 11R is being displayed centrally in the right-eye image 10R as well, and a person image 12R is being displayed to the left of the tower image 11R. A wall image 13R is being displayed at the lower right corner of the right-eye image 10R.

Parallax exists between the left-eye image 10L shown in FIG. 2a and the right-eye image 10R shown in FIG. 2b. In a case where these images are displayed as a stereoscopic image, it is necessary that the left-eye image 10L and right-eye image 10R be shifted horizontally in such a manner that the parallax of a certain image portion, which is common to both the right-eye image 10R and right-eye image 10R, will be removed (eliminated). In this embodiment, a desired object image portion is detected from each of the images of the left-eye image 10L and right-eye image 10R, and the left-eye image 10L and right-eye image 10R are shifted in the horizontal direction in such a manner that the parallax of the detected object image portion will be removed. In a case where a plurality of object image portions are found, the parallax of any one object image portion among the plurality of object image portions is removed.

In this embodiment, the face image of the person 12 is adopted as the desired object image portion, although it goes without saying that another object image portion will suffice.

With reference to FIG. 2a, processing for detecting a face image 5L of the person image 12L from the left-eye image 10L is executed and the face image 5L is detected. A frame 15L that designates the detected face image 5L is displayed in the left-eye image 10L. Similarly, with regard also to the right-eye image 10R shown in FIG. 2b, processing for detecting a face image 5R of the person image 12R is executed and the face image 5R is detected. A frame 15R that designates the detected face image 5R is displayed in the left-eye image 10R.

FIG. 3 illustrates the relationship between subject images and the stereoscopic imaging digital camera 1.

As mentioned above, a disparity in the person image 12 is eliminated when the left-eye image 10L and right-eye image 10R are shifted in such a manner that parallax between the face image 5L (person image 12L) detected from the left-eye image 10L and the face image 5R (person image 12R) detected from the left-eye image 10R is removed.

The tower 11 located rearward of the person 12 is represented by the tower image 11L contained in the left-eye image 10L and the tower image 11R contained in the right-eye image 10R. A disparity (rearward double image) develops between the tower images 11L and 11R. The wall 13 located forward of the person 12 is represented by the wall image 13L contained in the left-eye image 10L and the wall image 13R contained in the right-eye image 10R. A disparity (forward double image) develops between the wall image 13L and the wall image 13R.

Since the tower 11 is behind the person 12 having no visual disparity, the tower image 11L contained in the left-eye image 10L is rightward of the tower image 11R contained in the right-eye image 10R. On the other hand, since the wall 13 is in front of the person 12 having no visual disparity, the wall image 13L contained in the left-eye image 10L is leftward of the wall image 13R contained in the right-eye image 10R.

Figure 4:
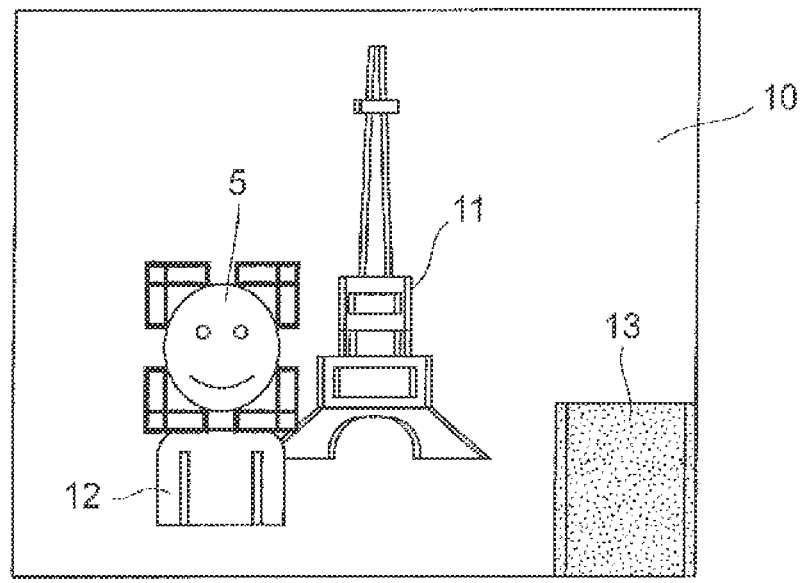
FIG. 4 is an example of a stereoscopic image.

FIG. 4 is an example of a stereoscopic image obtained by superimposing (shifting) the left-eye image 10L shown in FIG. 2a and the right-eye image 10R shown in FIG. 2b.

This stereoscopic image 10 is the result of shifting the left-eye image 10L and the right-eye image 10R so as to remove the parallax between the face image 5L detected from the left-eye image 10L and the face image 5R detected from the right-eye image 10R.

The stereoscopic image 10 contains the tower image 11, person image 12 and wall image 13 (these reference characters also make use of characters identical with the reference characters of the tower 11, person 12 and wall 13) corresponding to the tower 11, person 12 and wall 13. Whereas the person image 12 is free of visual disparity, the tower image 11 and wall image 13 exhibit visual disparity and are double images. In this embodiment, a display area that includes the detected face image 5 is decided in the stereoscopic image 10 and the image within this display area is displayed in enlarged form.

Figure 5:
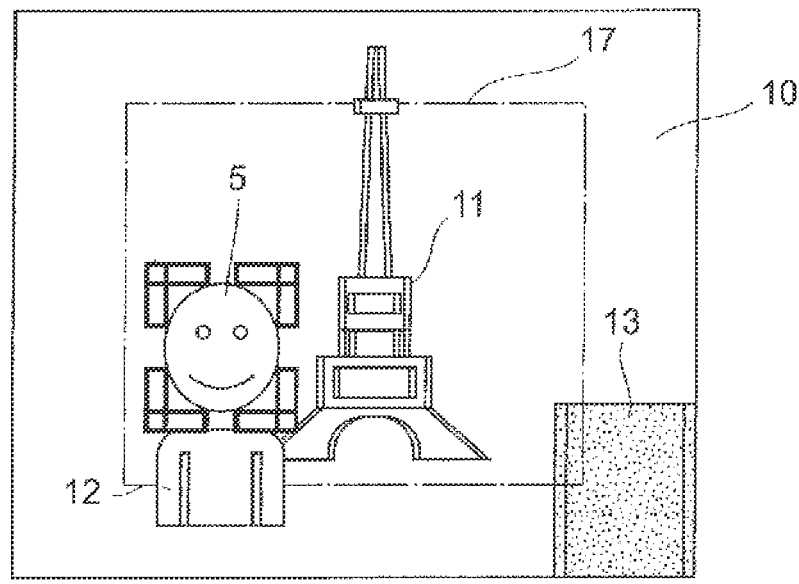
FIG. 5 is an example of a stereoscopic image.

FIG. 5 is an example of the stereoscopic image 10.

As mentioned above, a display area 17 is decided in the stereoscopic image 10 so as to contain the detected face image 5. The display area 17 possesses an aspect ratio the same as that of the stereoscopic image 10 and has sides parallel to respective ones of the top, bottom, left and right sides of the stereoscopic image 10. The image within the display area 17 is enlarged so as to be displayed over the entire display screen of the display unit. The image outside the display area 17 also contains the wall image 13 (a double image owing to parallax) representing the wall 13, which is an object forward of the face of the person 12 (close to the stereoscopic imaging digital camera 1) represented by the detected object image portion. The tower image 11 representing the tower 11, which is an object rearward of the face of the person 12 (far from the stereoscopic imaging digital camera), is a double image owing to parallax. Although it is required that the image of an object farther to the rear than the face 5 represented by the parallax-free face image 5 be made to exhibit three-dimensionality, it is preferred that the image of an object more forward than the face 5 be eliminated in order to mitigate the strain upon the eyes of the observer. In this embodiment, the image outside the display area 17 is not displayed and, hence, the double image of the object forward of the face 5 often will no longer be displayed. Moreover, since the display area 17 has been decided so as to contain the face image 5, a situation in which the object image portion desired to be viewed by the observer is not displayed can be avoided.

Figure 6:
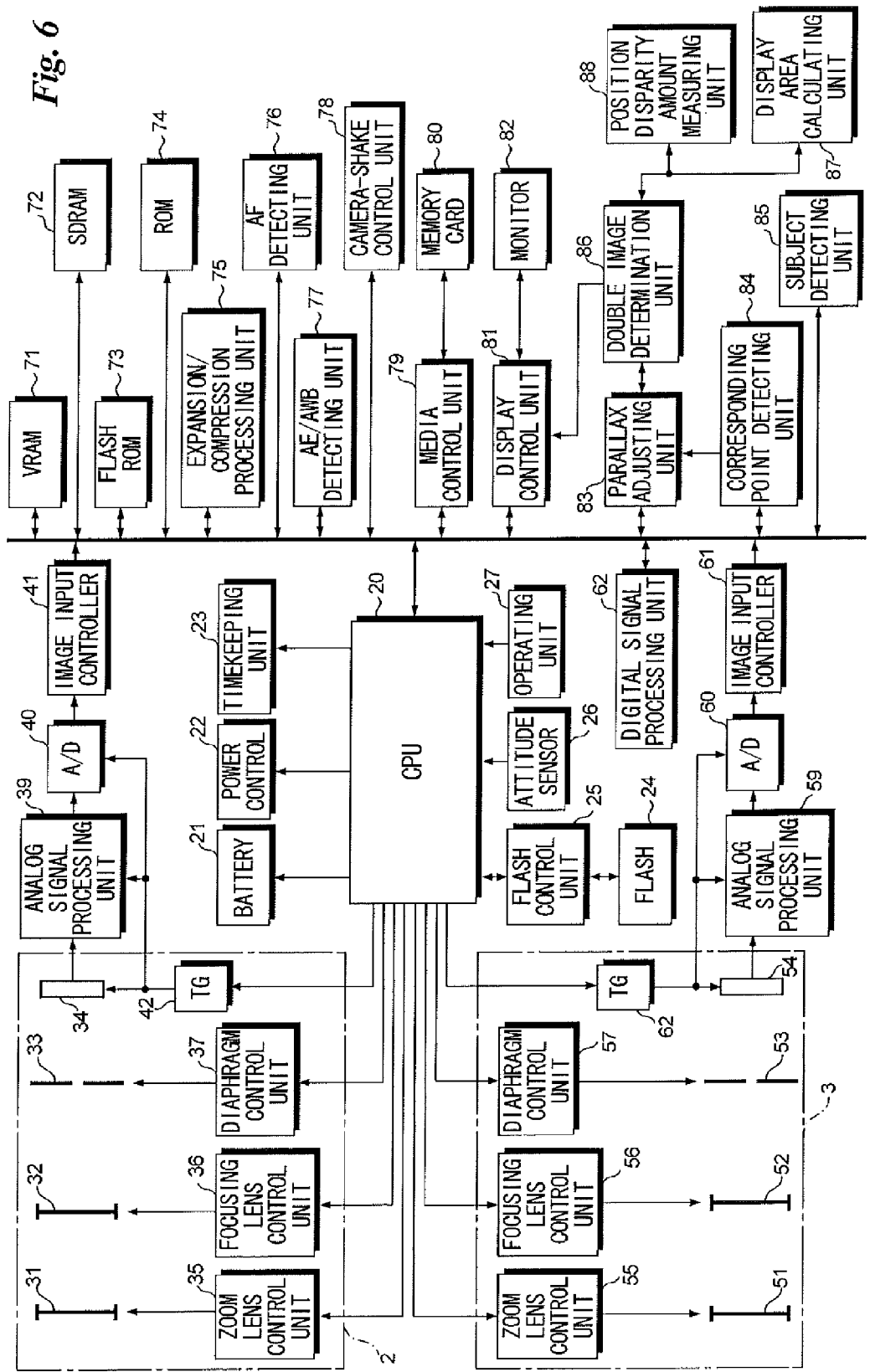
FIG. 6 is a block diagram illustrating the electrical configuration of a stereoscopic imaging digital camera.

FIG. 6 is a block diagram illustrating the electrical configuration of the stereoscopic imaging digital camera.

The overall operation of the stereoscopic imaging digital camera is controlled by a main CPU 20. The stereoscopic imaging digital camera is provided with an operating unit 27 that includes various buttons such as a mode setting button for an imaging mode and a playback mode, etc., and a movie button for designating the beginning and end of recording of stereoscopic moving images. An operation signal that is output from the operating unit 27 is input to the main CPU 20.

As mentioned above, the stereoscopic imaging digital camera includes the first capture device 2 and the second capture device 3. A subject is imaged by the first capture device 2 and second capture device 3.

The first capture device 2 images a subject, thereby outputting image data representing a left-eye image that constitutes a stereoscopic image. The first capture device 2 includes a first image sensor (CCD, CMOS, etc.) 34. A zoom lens 31, focusing lens 32 and a diaphragm 33 are provided in front of the first image sensor 34. The zoom lens 31, focusing lens 32 and diaphragm 33 are driven by a zoom lens control unit 35, a focusing lens control unit 36 and a diaphragm control unit 37, respectively. When the imaging mode is set and the left-eye image is formed on the photoreceptor surface of the first image sensor 34, a left-eye video signal representing the left-eye image is output from the first image sensor 34 based upon clock pulses supplied from a timing generator (TG) 42.

The left-eye video signal that has been output from the first image sensor 34 is subjected to prescribed analog signal processing in an analog signal processing unit 39 and is converted to digital left-eye image data in an analog/digital converting unit 40. The left-eye image data is input to a digital signal processing unit 62 from an image input controller 41. The left-eye image data is subjected to prescribed digital signal processing in the digital signal processing unit 62. Left-eye image data that has been output from the digital signal processing unit 62 is input to an AF detecting unit 76 and an AF evaluation value that decides the lens position of the focusing lens 32 is calculated. The focusing lens 32 is positioned based upon the autofocus (AF) evaluation value calculated. Further, the left-eye image data is input to an automatic exposure/automatic white balance (AE/AWB) detecting unit 77, where an amount of exposure and an amount of white balance adjustment are calculated. The f-stop value of the diaphragm 33 and the shutter speed (electronic shutter) of the first image sensor 34 are decided based upon the calculated amount of exposure. A white balance adjustment is performed in the analog signal processing unit 39 based upon the calculated amount of white balance adjustment.

The second capture device 3 includes a second image sensor 54. A zoom lens 51, focusing lens 52 and a diaphragm 53 driven by a zoom lens control unit 55, a focusing lens control unit 56 and a diaphragm control unit 57, respectively, are provided in front of the second image sensor 54. When the imaging mode is set and the right-eye image is formed on the photoreceptor surface of the second image sensor 54, a right-eye video signal representing the right-eye image is output from the second image sensor 54 based upon clock pulses supplied from a timing generator 62.

The right-eye video signal that has been output from the second image sensor 54 is subjected to prescribed analog signal processing in an analog signal processing unit 59 and is converted to digital right-eye image data in an analog/digital converting unit 60. The right-eye image data is input to the digital signal processing unit 62 from an image input controller 61. The right-eye image data is subjected to prescribed digital signal processing in the digital signal processing unit 62. Right-eye image data that has been output from the digital signal processing unit 62 also is input to the AF detecting unit 76 and an AF evaluation value that decides the lens position of the focusing lens 52 is calculated. The focusing lens 52 is positioned based upon the AF evaluation value calculated. Further, the right-eye image data is also input to the AE/AWB detecting unit 77, where an amount of exposure and an amount of white balance adjustment are calculated. The f-stop value of the diaphragm 53 and the shutter speed (electronic shutter) of the second image sensor 54 are decided based upon the calculated amount of exposure. A white balance adjustment is performed in the analog signal processing unit 59 based upon the calculated amount of white balance adjustment.

The items of left-eye image data and right-eye image data obtained as set forth above are input to a subject detecting unit 85 as well. A desired object image portion (face image) is detected in the subject detecting unit 85 from the left-eye image and from the right-eye image, as mentioned above. The items of left-eye image data, right-eye image data and data indicating the position of the detected object image portion are input to a position disparity amount measuring unit 88 upon simply passing through a parallax adjusting unit 83 and double image determination unit 86. In respective ones of the left-eye image and right-eye image, the position disparity amount measuring unit 88 measures the shift directions and amounts of disparity of the mutually corresponding image portions. Furthermore, the position disparity amount measuring unit 88 also detects either the positional disparity of the images (forward double image) representing the subject in front of the object represented by the detected object image portion or the positional disparity of the images (rearward double image) representing the subject behind this object.

The left-eye image and right-eye image are shifted in the parallax adjusting unit 83 in such a manner that the positional disparity between the object image portion detected in the left-eye image and the object image portion detected in the left-eye image will be eliminated (i.e., in such a manner that visual disparity is eliminated). The items of left-eye image data and right-eye image data the images of which have been shifted in the parallax adjusting unit 83 are input to a display control unit 81.

The items of data representing the position of the detected object image portion, the left-eye image and the right-eye image are input to a display area calculating unit 87 as well. The position of the display area and the size thereof are calculated, as mentioned above, in the display area calculating unit 87. Data representing the calculated position and size of the display area is applied to the display control unit 81 upon simply passing through the double image determination unit 86.

A monitor display unit 82 is controlled by the display control unit 81 in such a manner that the parallax of the detected object image portions is eliminated and, moreover, in such a manner that the image within the image display area is enlarged and displayed so as to be displayed over the entire display screen.

The stereoscopic imaging digital camera further includes a corresponding point detecting unit 84 which, in a case where an object image portion has been found from one of the left-eye and right-eye images, finds an object image portion from the other of these images. The stereoscopic imaging digital camera further includes a double image determination unit 86 for determining whether a forward double image representing a subject in front of an object represented by an object image portion exists and whether the extent of disparity of this forward double image is within an allowable range, as described below.

When the shutter-release button included in the operating unit 27 is pressed, the data (left-eye image data and right-eye image data) representing the stereoscopic image obtained as set forth above is recorded on a memory card 80 by a media control unit 79. Although it may be arranged so that the items of left-eye image and right-eye image representing the image within the display area are recorded on the memory card 80, it is preferred that the items of left-eye image and right-eye image obtained by imaging, inclusive of the image outside the image display area, be recorded on the memory card 80.

The stereoscopic imaging digital camera further includes a VRAM 71, an SDRAM 72, a flash ROM 73, a ROM 74, and an expansion/compressing unit to expand and compress data 75 for storing various data. The stereoscopic imaging digital camera further contains a battery 21. Power supplied from the battery 21 is applied to a power control unit 22. The power control unit 22 supplies power to each device constituting the stereoscopic imaging digital camera. The stereoscopic imaging digital camera further includes a timekeeping unit 23, a flash unit 24 controlled by a flash control unit 25, an attitude sensor 26 and a camera-shake control unit 78.

The operation program of the stereoscopic imaging digital camera has been stored on the above-mentioned memory card 80 and the stereoscopic imaging digital camera is made to operate by installing this operation program in the stereoscopic imaging digital camera. Naturally, the operation program may be pre-installed in the stereoscopic imaging digital camera or may be recorded on a portable recording medium other than the memory card 80. Furthermore, the operation program may be applied to the stereoscopic imaging digital camera over a network. In this case, the stereoscopic imaging digital camera would be provided with a communication device for connecting to the network.

Figure 7:
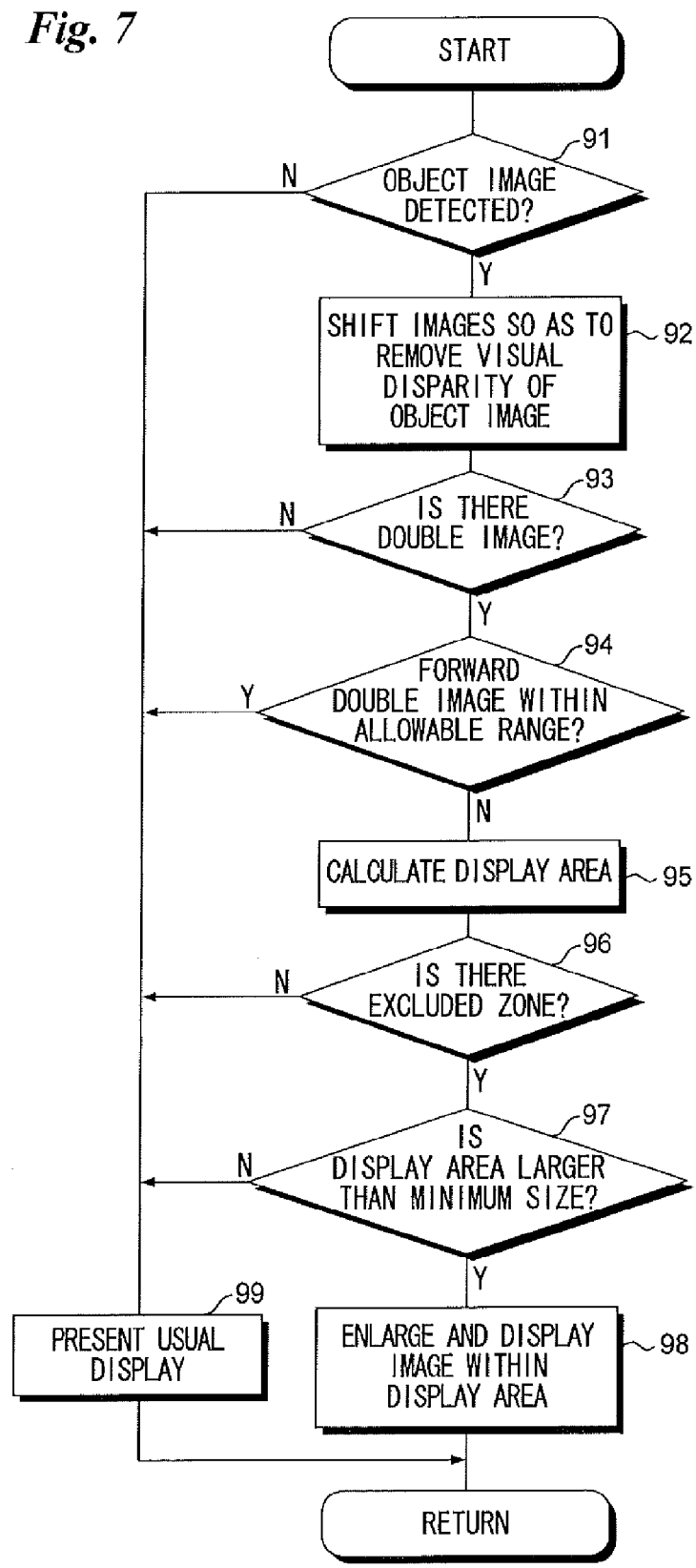
FIG. 7 is a flowchart illustrating the processing procedure of a stereoscopic imaging digital camera.

FIG. 7 is a flowchart illustrating the processing procedure of the stereoscopic imaging digital camera.

As mentioned above, subjects are imaged and the left-eye image and right-eye image are obtained as shown in FIGS. 2a and 2b. An object image portion (face image) is detected from the left-eye image and from the right-eye image. If an object image portion is detected even from either one of these images ("Y" at step 91), the left-eye image and the right-eye image are shifted in such a manner that visual disparity of the object image portion is removed (step 92), as illustrated in FIG. 4. In a case where an object image portion has been detected only from one image of the left-eye and right-eye images, the corresponding point detecting unit 84 executes processing for detecting feature points from the other image and detects an image portion, which corresponds to the object image portion detected from the one image, from the other image.

Based upon the result of measurement of position disparity obtained by the position disparity amount measuring unit 88, it is determined whether there is a forward double image representing a subject in front of the object represented by the detected object image portion (step 93), as mentioned above. In a case where such a forward double image exists ("YES" at step 93), whether the disparity of the forward double image is within the allowable range is determined based upon the result of measurement of position disparity obtained by the position disparity amount measuring unit 88 (step 94). If the disparity is outside the allowable range ("NO" at step 94), then, as mentioned above, the display area (which, for example, has a size smaller than that of the stereoscopic image and an aspect ratio the same as that of the stereoscopic image) is calculated so as to include the detected object image portion (step 95).

When the display area is detected, whether there is a zone excluded from the stereoscopic image (the left-eye image and right-eye image) is confirmed (step 96). If there is an excluded zone ("YES" at step 96), whether the calculated image area is larger than a minimum size (e.g., VGA: Video Graphic Array) (step 97).

If the calculated display area is larger than the minimum size ("YES" at step 97), then the image within the image area can be displayed over the entire display screen. Hence, the image within the display area is displayed in enlarged form (step 98). Thus there is displayed a stereoscopic image that mitigates eye strain and from which a forward double image, which produces discomfort when observed, has been eliminated. If the calculated display area is smaller than the minimum size ("NO" at step 97), then the image within the image area cannot be displayed over the entire display screen. Accordingly, the entire stereoscopic image is displayed on the entirety of the display screen instead of the image within the display area being enlarged and displayed (step 99).

If an object image portion could not be detected ("NO" at step 91), or if there is no forward double image ("NO" at step 93), or if the amount of disparity in a forward double image is within the allowable range ("YES" at step 94), or if there is no excluded zone ("NO" at step 96), then the image within the display area cannot be displayed over the entire display surface. Accordingly, the entire stereoscopic image is displayed on the entirety of the display screen instead of the image within the display area being enlarged and displayed (step 99).

The foregoing embodiment is implemented with regard to left-eye image and right-eye image obtained at the time of image capture. However, it goes without saying that similar processing can be implemented not only at the time of image capture but also at reproduction of left-eye and right-eye images recorded on a portable recording medium such as the memory card 80 (although the medium need not be portable).

In the foregoing embodiment, a stereoscopic image from which a forward double image has been eliminated can be displayed. As a result, at the time of image capture, or so-called live viewing, and at the time of playback, the user can be allowed to see an image which has an aspect ratio identical with that of the captured image and, moreover, which has little visual disparity. In the embodiment described above, so-called auto-playback is taken into account and observer eye strain can be alleviated in such auto-playback.

In order to eliminate a forward double image, accurate detection of face images (object images) in respective ones of the left-eye and right-eye image is desired. However, in cases such as one where the face is far from the stereoscopic imaging digital camera 1, one where the face is obliquely oriented rather than facing forward, or one where all or a part of the face is dark, there are instances where the face image cannot be detected accurately and can only be detected from one image of the left-eye and right-eye images. Even in such cases it is preferred that the forward double image be eliminated, as mentioned above, by detecting the face image also from the other image of the left-eye and right-eye images. In order to detect the face image, if processing for matching with a face image template is executed with respect to the entirety of the other image, in which a face image could not be detected, of the left-eye and right-eye images, and a face image is thus detected, then the calculation of the above-mentioned display area (the processing at step 95 in FIG. 7) will take a comparatively long period of time. It is preferred, therefore, that the face image be detected comparatively quickly from the other image in which the face image could not be detected. The embodiment set forth below is for detecting a face image comparatively quickly from the other image in which the face image could not be detected.

FIGS. 8 to 17 illustrate another embodiment. This embodiment, as mentioned above, detects an object image comparatively quickly from the other image, of the left-eye and right-eye images, in which an object image could not be detected, and decides a display area in such a manner that the object image portion detected only from the one image will also fall within the display area. First, reference will be had to FIGS. 8 to 17 to describe processing in a case where a plurality of persons are contained in the left-eye image and in the right-eye image and a face image is detected in both the left-eye and right-eye images with regard to at least one person. A detection target zone for processing (described later) for detecting a face image is set upon arranging it so that there will be no visual disparity with regard to the face image detected in both images.

Figure 8:
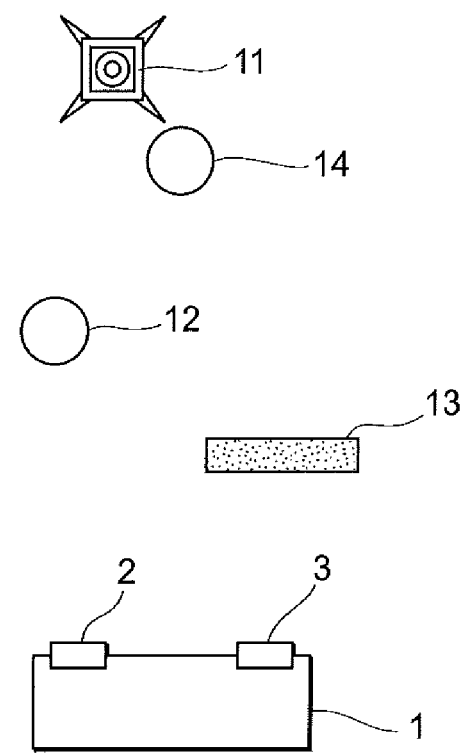
FIG. 8 illustrates the positional relationship between subjects and a stereoscopic imaging digital camera.

FIG. 8, which illustrates planarly the relationship between the stereoscopic imaging digital camera 1 and subjects, corresponds to FIG. 1. Items in FIG. 8 identical with those shown in FIG. 1 are designated by like reference characters and need not be described again.

In FIG. 8, a second person 14, who is behind and on the right side of the above-mentioned person (a first person) 12, is in front of the tower 11. In the above-described embodiment, the person image (face image) that is the object image within the imaging zone is that of a single person. In this embodiment, however, the second person 14 is added anew so that the imaging zone now contains the person images of two persons (the number of persons may be three or more).

Figure 9A:
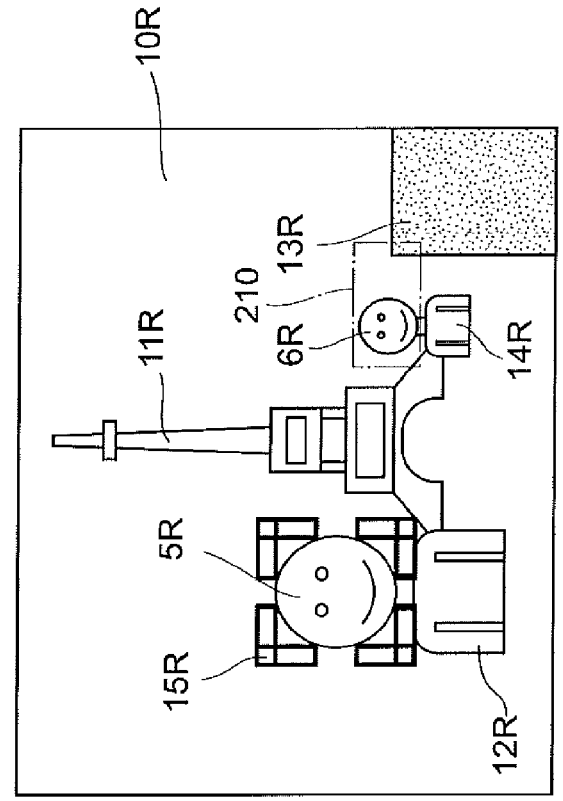
FIG. 9a illustrates a left-eye image and FIG. 9b a right-eye image.
Figure 9B:
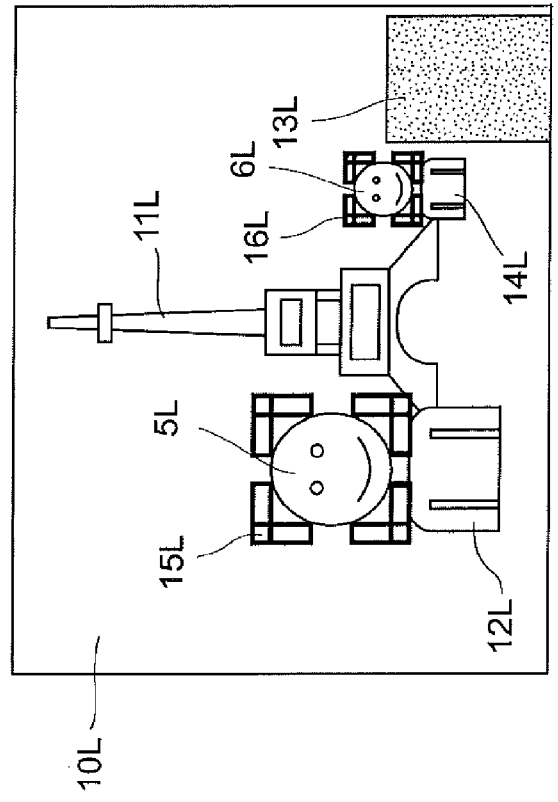

FIGS. 9a and 9b are a left-eye image and a right-eye image obtained by imaging the subjects, which have the positional relationship shown in FIG. 8, in the first capture devices 2 and 3, respectively, of the stereoscopic imaging digital camera 1. FIGS. 9a and 9b also correspond to FIGS. 2a and 2b, respectively, and items in FIGS. 9a and 9b identical with those shown in FIGS. 2a and 2b are designated by like reference characters and need not be described again.

In the left-eye image 10L, processing for detecting an object image portion is executed and it will be assumed that the face image 5L of the first person 12 and a face image 6L of the second person 14 have been detected. (The frame 15L enclosing the face image 5L and a frame 16L enclosing the face image 6L are also being displayed.) Similarly, in the right-eye image 10R, processing for detecting an object image portion is executed and it will be assumed that, although the face image 5R of the first person 12 has been detected (the frame 15R enclosing the face image 5R is being displayed), a face image 6R of the second person 14 has not been detected.

The face image 6R corresponding to the face image 6L is found from the right-eye image 10R by utilizing the face image 6L detected from the left-eye image 10L.

FIG. 10 compares the size of the face image 5L (5R) detected from both the left-eye image 10L and the right-eye image 10R and the size of the face image 6L detected only from one image of the left-eye image 10L and right-eye image 10R.

In this embodiment, if the size of the face image 5L (5R) detected from both images is larger than the size of the face image 6L detected only from the one image, then it will be assumed that the subject represented by the face image 6L detected from only the one image is at a position far from (behind) the subject represented by the face image 5L detected from both images.

As described with reference to FIG. 3, when the visual disparity between the face image 5L (see FIG. 9a) and the object image 5R (see FIG. 9b) detected from both images is eliminated, the subject rearward of this object image 5 is such that its image represented by the left-eye image 10L is on the right side and its image represented by the right-eye image 10R is on the left side. Therefore, if a face image corresponding to the face image 6L on the right side of the position in right-eye image 10R corresponding to the face image 6L detected in the left-eye image 10L is found from the right-eye image 10R, then this can be found in a comparative short period of time.

The purpose here is the desire to find the face image and to make parallax conform to the face image. However, in a case where the face images have been found in respective ones of the left-eye and right-eye images, these images will have been stored in a file. When coordinate information representing the region of the face image has been recorded in the header information of the file, the range over which corresponding points are detected in order to adjust parallax becomes a range that is extremely limited. However, in a system in which a brute force method is applied to the image space in circumstances where there is a lack of information as to where a face image is located in a case where a face image has been detected in only one of left-eye and right-eye images, finding the face image that will form the pair entails enormous cost in terms of time. In order to improve response at time of use, therefore, limiting the search range by some means or other and then executing the corresponding-point detection processing at high speed is the key. Accordingly, by comparing the size of the face image (the face image detected with both) that could be detected from both the left-eye and right-eye images and the size of the face image (the face image detected with one eye) that could be detected from one image of the left-eye and right-eye images, it is determined whether the single-eye-detected face image is in front of or behind the both-eye-detected face image and the search range as to whether to search in front or behind is limited based upon the front- or behind-determination information.

In this embodiment, if it is determined that the size of an object image portion that could be found from only the other image is larger than the size of an object image portion that could be found from both the left-eye image 10L and the right-eye image 10R and, moreover, the one image in which an object image portion could not be found is the left-eye image, or if it is determined that the size of an object image portion that could be found from only the other image is smaller than the size of an object image portion that could be found from both the left-eye image 10L and the right-eye image 10R and, moreover, the one image in which an object image portion could not be found is the right-eye image, then the object image portion that could not be found from the one image is found from the right side of the position corresponding to the object image portion that could be found in the other image.

FIG. 11 expresses the face images 5L, 6L and the face images 5R, 6R, which are contained in respective ones of the left-eye image 10L and right-eye image 10R captured using the stereoscopic imaging digital camera 1 as shown in FIGS. 9a and 9b, in correspondence with the positional relationship between the person images 12 (12L and 12R) and 14 (14L and 14R) of these face images 5L and 6L and face images 5R and 6R, and the stereoscopic imaging digital camera 1.

With reference also to FIGS. 9a and 9b, assume that with regard to the person at the location near stereoscopic imaging digital camera 1, the person has been detected as the face image 5L from the left-eye image 10L and as the face image 5R from the right-eye image 10R. Owing to detection of the face image 5L from the left-eye image 10L, the frame 15L is being displayed around the face image 5L, as shown in FIGS. 9a and 11. Owing to detection of the face image 5R from the right-eye image 10L, the frame 15R is being displayed, as shown in FIGS. 9a and 11.

Referring to FIG. 9b, assume that with regard to the person at the location far from the stereoscopic imaging digital camera 1, the person has been detected as the face image 6L from the left-eye image 10L but that the face image 6R could not be detected from the right-eye image 10R. In such case the right side of the position corresponding to the face image 6L detected from the left-eye image 10L is set in the right-eye image 10R as a detection target zone 210 for detecting the face image 6R. More specifically, the detection target zone 210, which is on the right side of the position in right-eye image 10R corresponding to the left end of the frame 16L enclosing the face image 6L detected in the left-eye image 10L, has a maximum width w1, which is less than a value obtained by adding the width of the detected face to the maximum amount of visual disparity, and a height h1 that corresponds to the height of the face image 6L detected in the left-eye image 10L. Naturally, the left end of the detection target zone 210 may be slightly leftward of the left end of the frame 16L enclosing the face image 6L detected in the left-eye image 10L, and the height h1 of the detection target zone 210 may be slightly larger, at the top and bottom, than the height of the face image 6L detected in the left-eye image 10L. Since the face image 6R is detected from the detection target zone 210, the face image 6R can be detected comparatively quickly.

FIG. 12a is an example of a left-eye image, and FIG. 12b is an example of a right-eye image. FIG. 13, which corresponds to FIG. 11, expresses the face images 5L, 6L and the face images 5R, 6R, which are contained in respective ones of the left-eye image 10L and right-eye image 10R captured using the stereoscopic imaging digital camera 1 as shown in FIGS. 12a and 12b, in correspondence with the positional relationship between the person images 12 and 14 of these face images 5L and 6L and face images 5R and 6R, and the stereoscopic imaging digital camera 1.

Assume that with regard to the person at the location far from the stereoscopic imaging digital camera 1, the person has been detected as the face image 6L from the left-eye image 10L and as the face image 6R from the right-eye image 10R. Owing to detection of the face image 6L from the left-eye image 10L, the frame 16L is being displayed around the face image 6L, as shown in FIGS. 12a and 13. Owing to detection of the face image 6R from the right-eye image 10R, the frame 16R is being displayed, as shown in FIGS. 12a and 13.

Assume that with regard to the person at the location near the stereoscopic imaging digital camera 1, the person has been detected as the face image 5R from the right-eye image 10R but that the face image 5L could not be detected from the left-eye image 10L. In such case the right side of the position corresponding to the face image 5R detected from the right-eye image 10R is set in the right-eye image 10R as a detection target zone 211 for detecting the face image 5L. More specifically, the detection target zone 211, which is on the left side of the position in left-eye image 10L corresponding to the right end of the frame 15R enclosing the face image 5R detected in the right-eye image 10R, has a maximum width w2, which is less than a value obtained by adding the width of the detected face to the maximum amount of visual disparity, and a height h2 that corresponds to the height of the face image 5R detected in the right-eye image 10R. Naturally, the left end of the detection target zone 211 may be slightly leftward of the left end of the frame 15R enclosing the face image 5R detected in the right-eye image 10R, and the height h2 of the detection target zone 211 may be slightly larger, at the top and bottom, than the height of the face image 5R detected in the right-eye image 10R. Since the face image 5L is detected from the detection target zone 211, the face image 5L can be detected comparatively quickly.

Further, if it is determined that the size of an object image portion that could be found from only the other image is larger than the size of an object image portion that could be found from both the left-eye image 10L and the right-eye image 10R and, moreover, the one image in which an object image portion could not be found is the right-eye image, or if it is determined that the size of an object image portion that could be found from only the other image is smaller than the size of an object image portion that could be found from both the left-eye image 10L and the right-eye image 10R and, moreover, the one image in which an object image portion could not be found is the left-eye image, then the object image portion that could not be found from the one image is found from the left side of the position corresponding to the object image portion that could be found in the other image.

Figure 14A:
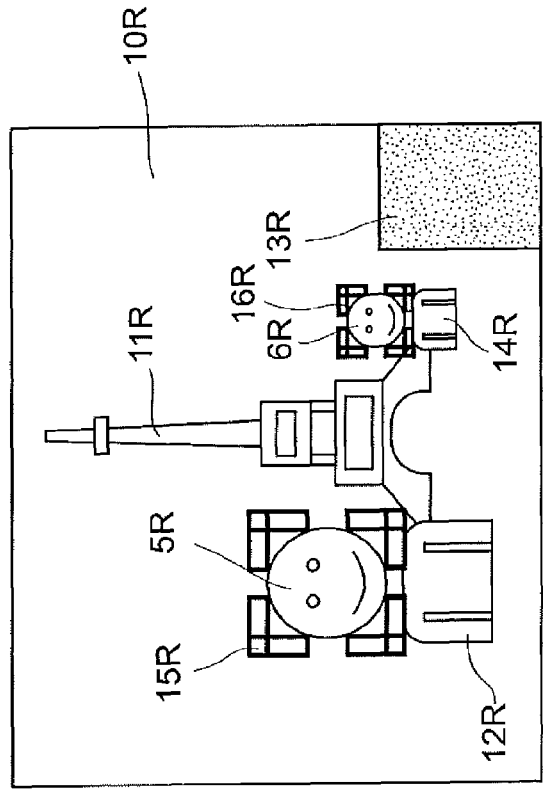
FIG. 14a illustrates a left-eye image and FIG. 14b a right-eye image.
Figure 14B:
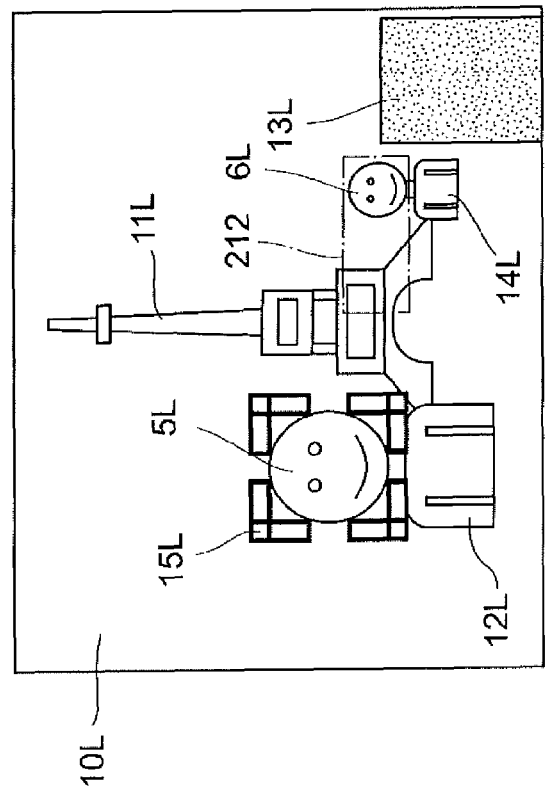

FIG. 14a is an example of a left-eye image, and FIG. 14b is an example of a right-eye image. FIG. 15, which corresponds to FIGS. 11 and 13, expresses the face images 5L, 6L and the face images 5R, 6R, which are contained in respective ones of the left-eye image 10L and right-eye image 10R captured using the stereoscopic imaging digital camera 1 as shown in FIGS. 14a and 14b, in correspondence with the positional relationship between the person images 12 and 14 of these face images 5L and 6L and face images 5R and 6R, and the stereoscopic imaging digital camera 1.

In a manner similar to that described above with reference to FIGS. 9a and 9b and FIG. 11, assume that with regard to the person at the location near the stereoscopic imaging digital camera 1, the person has been detected as the face image 5L from the left-eye image 10L and as the face image 5R from the right-eye image 10R.

Assume that with regard to the person at the location far from the stereoscopic imaging digital camera 1, the person has been detected as the face image 6R from the right-eye image 10R but that the face image 6L could not be detected from the left-eye image 10L. In such case the left side of the position corresponding to the face image 6R detected from the right-eye image 10R is set in the left-eye image 10L as a detection target zone 212 for detecting the face image 6L. The detection target zone 212 is set on the left side of the position in the left-eye image 10L corresponding to the right end of the frame 16R enclosing the face image 6R detected in the right-eye image 10R. The size of the detection target zone 212 is the same as that of the detection target zone 210 described above (although it may be different, as a matter of course).

Figure 16A:
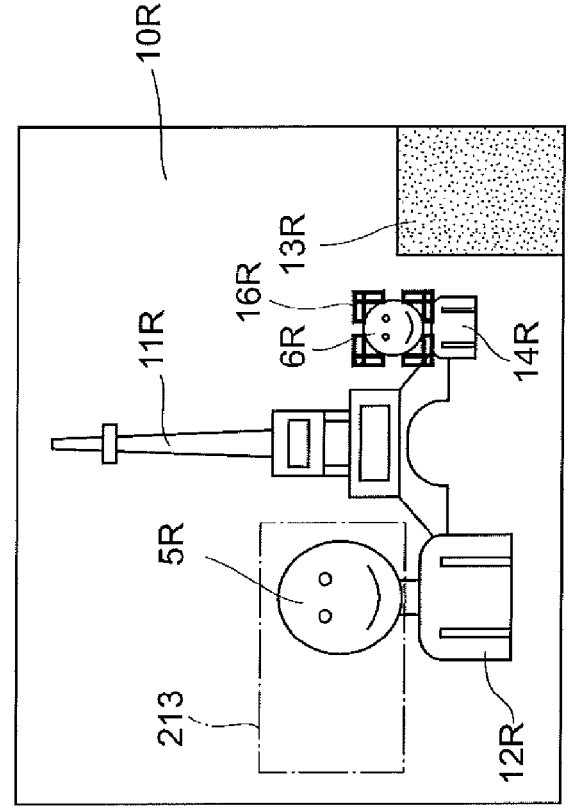
FIG. 16a illustrates a left-eye image and FIG. 16b a right-eye image.
Figure 16B:
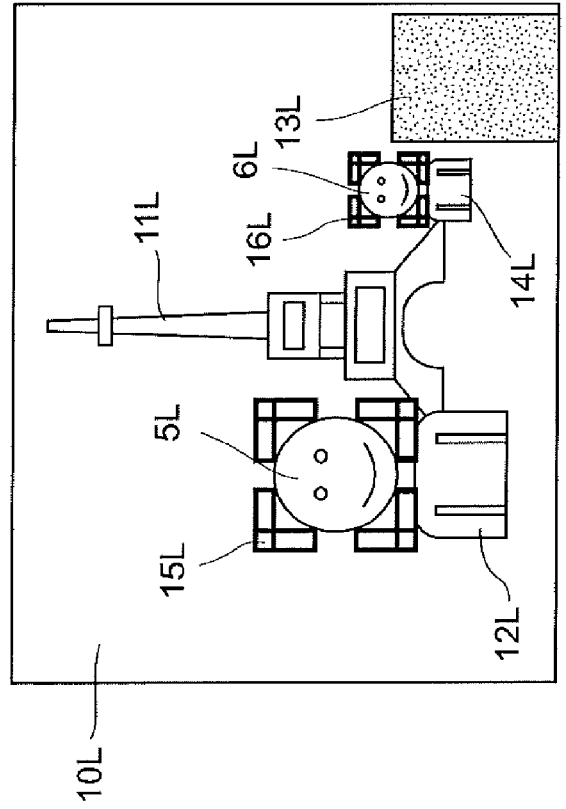

FIG. 16a is an example of a left-eye image, and FIG. 16b is an example of a right-eye image. FIG. 17, which corresponds to FIGS. 11, 13 and 15, expresses the face images 5L, 6L and the face images 5R, 6R, which are contained in respective ones of the left-eye image 10L and right-eye image 10R captured using the stereoscopic imaging digital camera 1 as shown in FIGS. 16a and 16b, in correspondence with the positional relationship between the person images 12 and 14 of these face images 5L and 6L and face images 5R and 6R, and the stereoscopic imaging digital camera 1.

Assume that with regard to the person at the location far from the stereoscopic imaging digital camera 1, the person has been detected as the face image 6L from the left-eye image 10L and as the face image 6R from the right-eye image 10R.

Assume that with regard to the person at the location near the stereoscopic imaging digital camera 1, the person has been detected as the face image 5L from the left-eye image 10L but that the face image 5R could not be detected from the right-eye image 10R. In such case the left side of the position corresponding to the face image 5L detected from the left-eye image 10L is set in the right-eye image 10R as a detection target zone 213 for detecting the face image 5R. The size of the detection target zone 213 is the same as that of the above-described detection target zone 211 (see FIG. 12a) (although it may be different).

In the foregoing embodiment, the size of the face image detected from both the left-eye and right-eye images and the size of the face image detected from only one image of the left-eye and right-eye image are compared, and a detection target zone for detecting a face image not detected from the other image is decided. However, if there is not at least one face image detected from both the left-eye image and right-eye image (i.e., if a face image cannot be detected stably), then the detection target zone cannot be decided. In the embodiment described next, even if a face image detected from both the left-eye image and the right-eye image does not exist, a face image is detected from one image of the left-eye and right-eye images and a detection target zone for detecting a face image not detected from the other image is decided.

Figure 18:
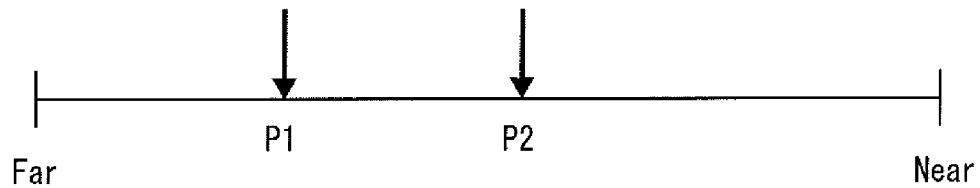
FIG. 18 illustrates a focusing lens position when a central portion of an image is focused and a focusing lens position when an object image portion is focused.

FIG. 18 illustrates positions of focusing lenses.

In a case where a common object image portion (a face image) could not be detected from the left-eye image 10L and right-eye image 10R, a portion for detecting the object image portion in the other image corresponding to the object image portion detected in the one image is decided utilizing the positions of the focusing lenses.

Assume that a focusing lens position that prevails when the central portion of the image, of the left-eye and right-eye images, in which the object image portion has been detected is brought into focus is P1, and assume that a focusing lens position that prevails when the detected object image portion is brought into focus is P2. In such case the positional relationship between the subject present at the central portion of the image and the object represented by the detected object image portion will be understood from the positional relationship between these positions P1 and P2. In this embodiment, the left-eye image and right-eye image are adjusted in such a manner that the central portion of the image will exhibit no visual disparity.

If the position of an object represented by an object image portion found from only the other image of the left-eye and right-eye images is in front of the position of the subject that corresponds to the image, which has no visual disparity, at the central portion of this other image and, moreover, the one image in which an object image portion could not be found is the right-eye image, or if the position of an object represented by an object image portion found from only the other image of the left-eye and right-eye images is behind the position of the subject that corresponds to the image, which has no visual disparity, at the central portion of this other image and, moreover, the one image is the left-eye image, then the object image portion that could not be found from the one image is found from the left side of the position corresponding to the object image portion found in the other image.

Figure 19A:
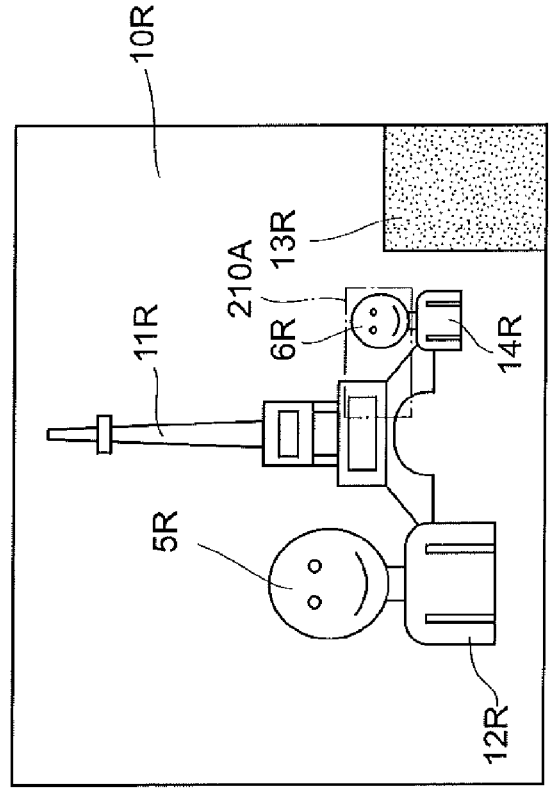
FIG. 19a illustrates a left-eye image and FIG. 19b a right-eye image.
Figure 19B:
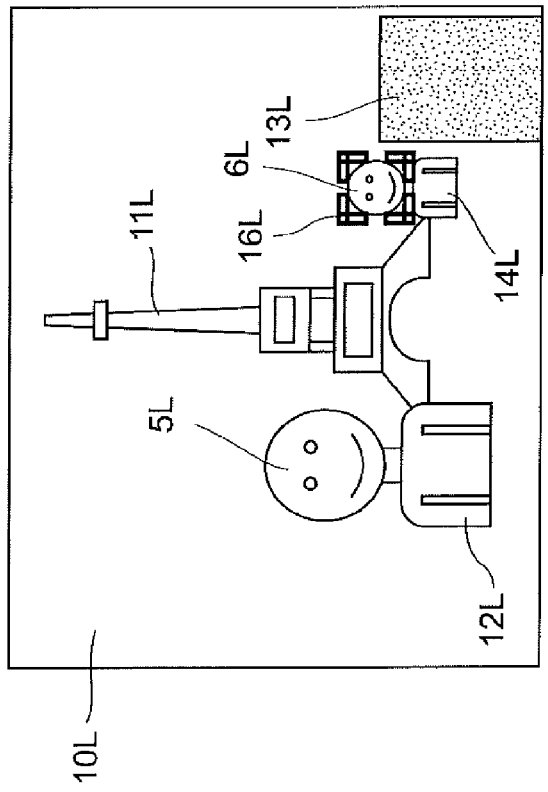

FIG. 19a is an example of a left-eye image and FIG. 19b an example of a right-eye image. Items in FIGS. 19a and 19b identical with those shown in FIGS. 9a and 9b are designated by like reference characters and need not be described again.

The tower image 11L is at the center of the left-eye image 10L and the tower image 11R is at the center of the right-eye image 10R. Unlike the above-described embodiment, it is assumed that visual disparity of the centrally located tower images 11L and 11R has been removed between the left-eye image 10L and the right-eye image 10R.

Further, it is assumed that although the face image 6L has been detected from the left-eye image 10L, the face image 6R has not been detected from the right-eye image 10R. Since the focusing lens position P2 of the object image (the face image 6L detected from the left-eye image 10L) is further toward the near side than is the focusing lens position P1 of the central portion (tower 11), as shown in FIG. 18, it will be understood that the person 14 of the face 6 is forward of the tower 11. Accordingly, since the tower 11 and person 14 correspond to the positional relationship shown in FIG. 17, a detection target zone 210A for detecting the face image 6R is set, in the right-eye image 10R, on the left side of the position corresponding to the detected face image 6L.

Figure 20B:
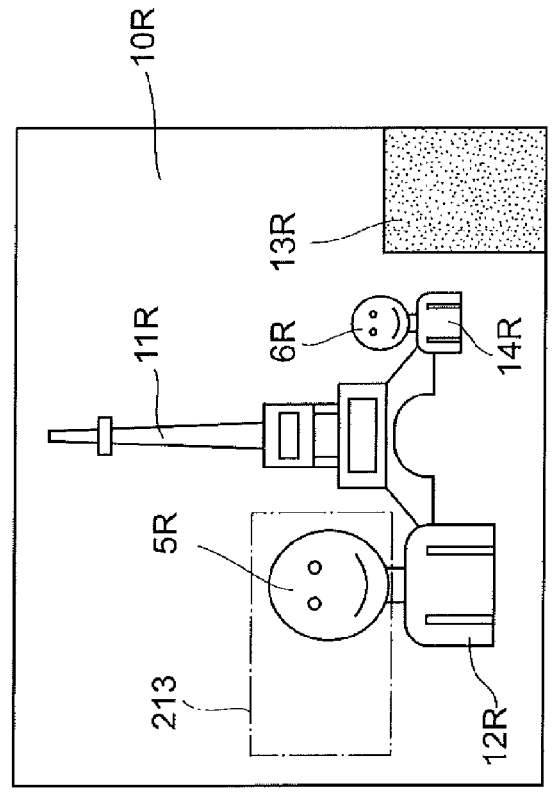
FIG. 20a illustrates a left-eye image and FIG. 20b a right-eye image.
Figure 20A:
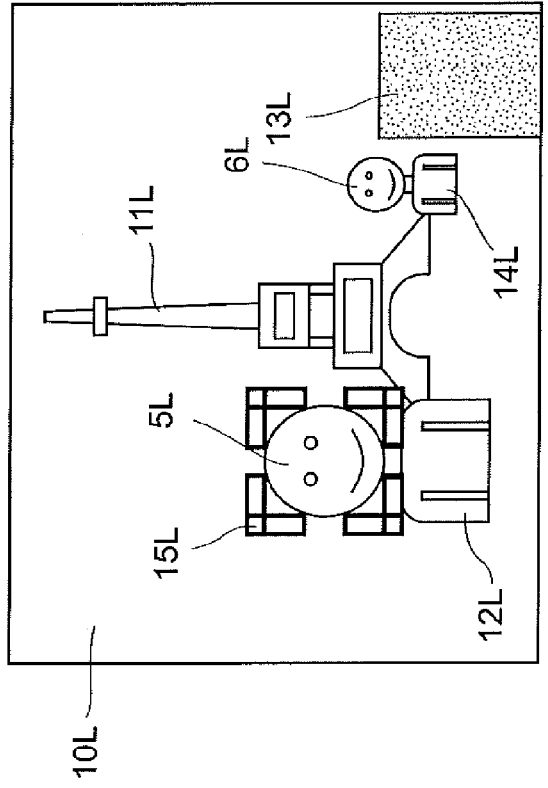

FIG. 20a is an example of a left-eye image and FIG. 20b an example of a right-eye image. Items in FIGS. 20a and 20b identical with those shown in FIGS. 16a and 16b are designated by like reference characters and need not be described again. Unlike the above-described embodiment, it is assumed that visual disparity of the tower images 11L and 11R has been removed between the left-eye image 10L and the right-eye image 10R in FIGS. 20a and 20b as well.

It is assumed that although the face image 5L has been detected from the left-eye image 10L, the face image 5R has not been detected from the right-eye image 10R. In this case also, in a manner similar to that shown in FIGS. 19a and 19b, the person 12 for which the face image 5R is to be detected is forward of the tower 11 and therefore it will be understood that the detection target zone 213 for detecting the face image 5R is set, in right-eye image 10R, on the left side of the position corresponding to the detected face image 5L.

If the position of an object represented by an object image portion found from only the other image of the left-eye and right-eye images is in front of the position of the subject that corresponds to the image, which has no visual disparity, at the central portion of this other image and, moreover, the one image in which an object image portion could not be found is the left-eye image, or if the position of an object represented by an object image portion found from only the other image of the left-eye and right-eye images is behind the position of the subject that corresponds to the image, which has no visual disparity, at the central portion of this other image and, moreover, the one image in which the object image portion could not be found is the right-eye image, then the object image portion that could not be found from the one image is found from the right side of the position corresponding to the object image portion found in the other image.

Figure 21A:
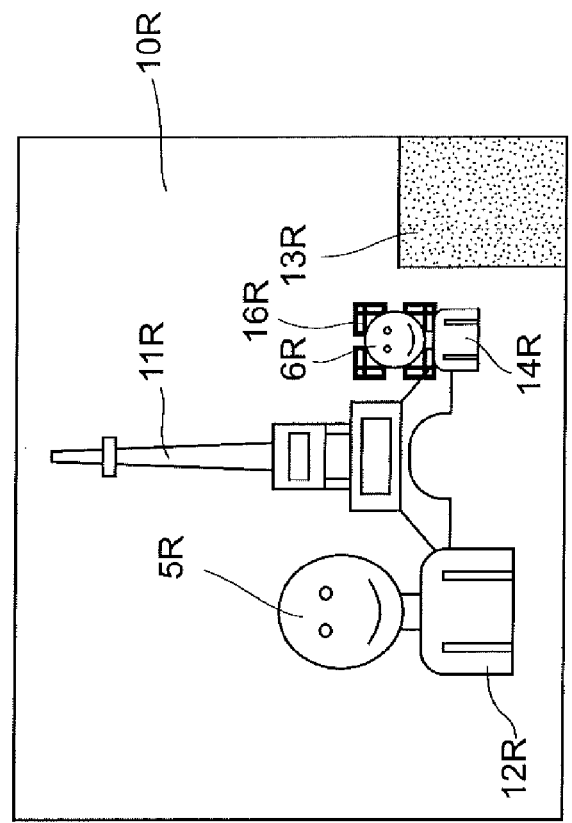
FIG. 21a illustrates a left-eye image and FIG. 21b a right-eye image.
Figure 21B:
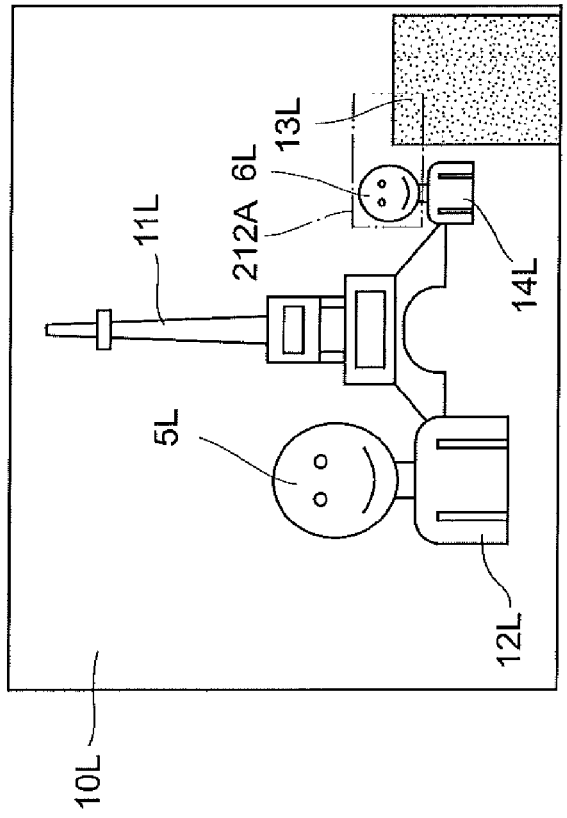

FIG. 21a is an example of a left-eye image and FIG. 21b an example of a right-eye image. Items in FIGS. 21a and 21b identical with those shown in FIGS. 14a and 14b are designated by like reference characters and need not be described again. It is assumed that visual disparity of the tower images 11L and 11R has been removed between the left-eye image 10L and the right-eye image 10R in FIGS. 21a and 21b as well.

Further, it is assumed that although the face image 6R has been detected from the right-eye image 10R, the face image 6L has not been detected from the left-eye image 10L. Since the tower 11 and person 14 correspond to the positional relationship shown in FIG. 13, a detection target zone 212A for detecting the face image 6L is set, in the left-eye image 10L, on the right side of the position corresponding to the detected face image 6R.

Figure 22B:
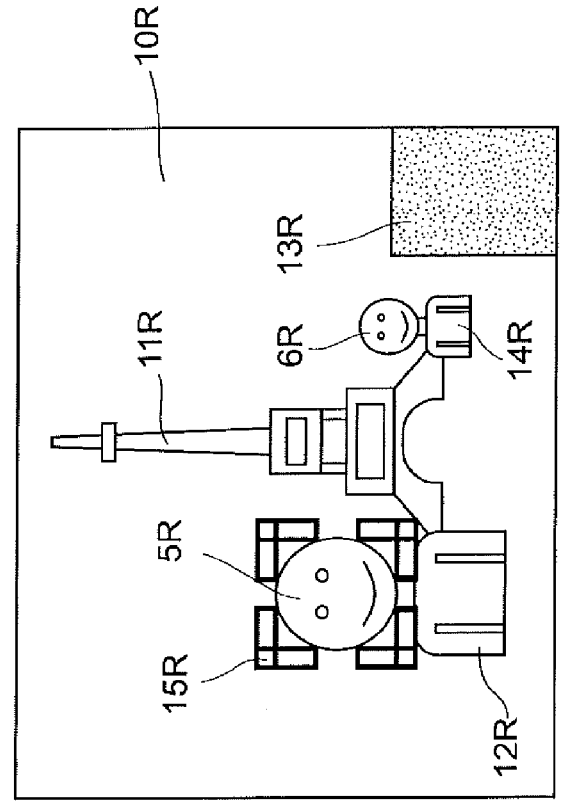
FIG. 22a illustrates a left-eye image and FIG. 22b a right-eye image.
Figure 22A:
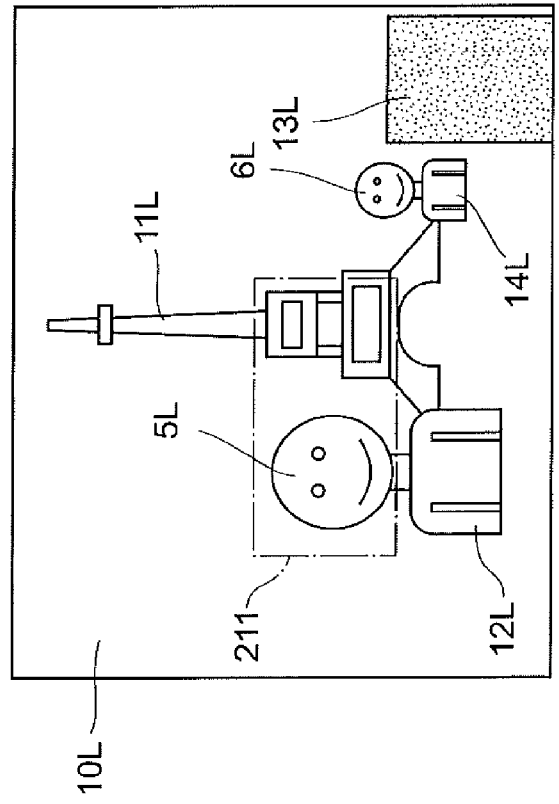

FIG. 22a is an example of a left-eye image and FIG. 22b an example of a right-eye image. Items in FIGS. 22a and 22b identical with those shown in FIGS. 12a and 12b are designated by like reference characters and need not be described again. It is assumed that visual disparity of the tower images 11L and 11R has been removed between the left-eye image 10L and the right-eye image 10R in FIGS. 22a and 22b as well.

It is assumed that although the face image 5R has been detected from the right-eye image 10R, the face image 5L has not been detected from the left-eye image 10L. In this case also, in a manner similar to that shown in FIGS. 21a and 21b, the person 12 for which the face image 5L is to be detected is forward of the tower 11 and therefore it will be understood that the detection target zone 211 for detecting the face image 5L is set, in left-eye image 10L, on the right side of the position corresponding to the detected face image 5R.

Whereas in FIG. 9b the detection target zone 210 has been set on the right side with the face image 6L detected in the left-eye image 10L serving as the reference, in FIG. 19b the detection target zone 210A has been set on the left side with the face image 6L detected in the left-eye image 10L serving as the reference. Further, whereas in FIG. 14a the detection target zone 212 has been set on the left side with the face image 6R detected in the right-eye image 10R serving as the reference, in FIG. 21a the detection target zone 212A has been set on the left side with the face image 6R detected in the right-eye image 10R serving as the reference. The reason why the direction in which the detection target zone is set thus differs is as follows: In FIGS. 9b and 14a, visual disparity of the person 12 whose face image has been detected in both the left-eye image 10L and the right-eye image 10R has been removed, and the detection target zones 210 and 212 have been set, with the person 12 serving as the reference, in circumstances where the person 14 whose face image 6R or 6L is to be detected is rearward of the person 12. On the other hand, in FIGS. 19b and 21a, the visual disparity between the images 11L and 11R of the tower 11 has been removed and the detection target zones 210A and 212A have been set, with the tower 11 serving as the reference, in circumstances where the person 14 whose face image 6R or 6L is to be detected is forward of the tower 11.

Figure 23:
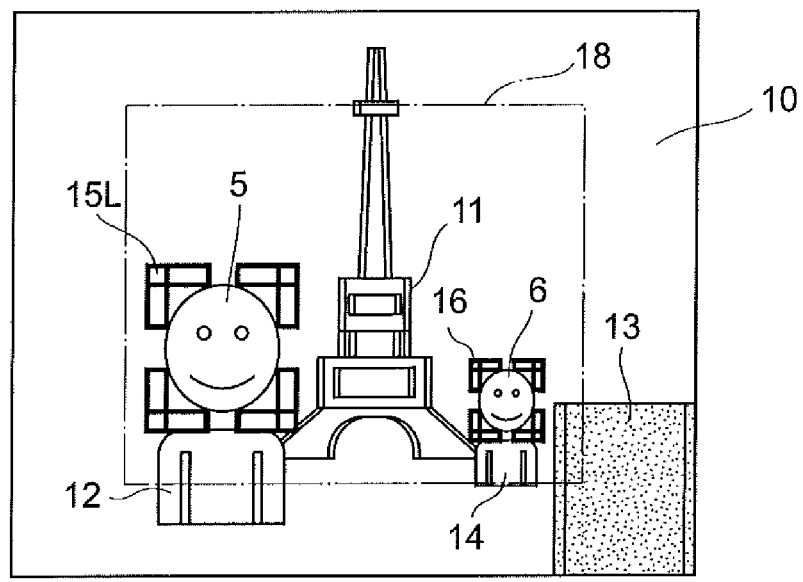
FIG. 23 is an example of a stereoscopic image.

FIG. 23, which is an example of a stereoscopic image in which a left-eye image and a right-eye image have been superimposed, corresponds to FIG. 5. Items in FIG. 23 identical with those shown in FIG. 5 are designated by like reference characters and need not be described again.

As set forth above, even in a case where a face image corresponding to the face image 6L detected from the left-eye image 10L could not be detected from the right-eye image 10R, the face image 6R is found. A display area 18 is decided so as to enclose the face images 5 and 6 (the frames 15 and 16 are also being displayed) contained in the stereoscopic image. The images within the decided display area are displayed over the entire display screen.

Figure 24:
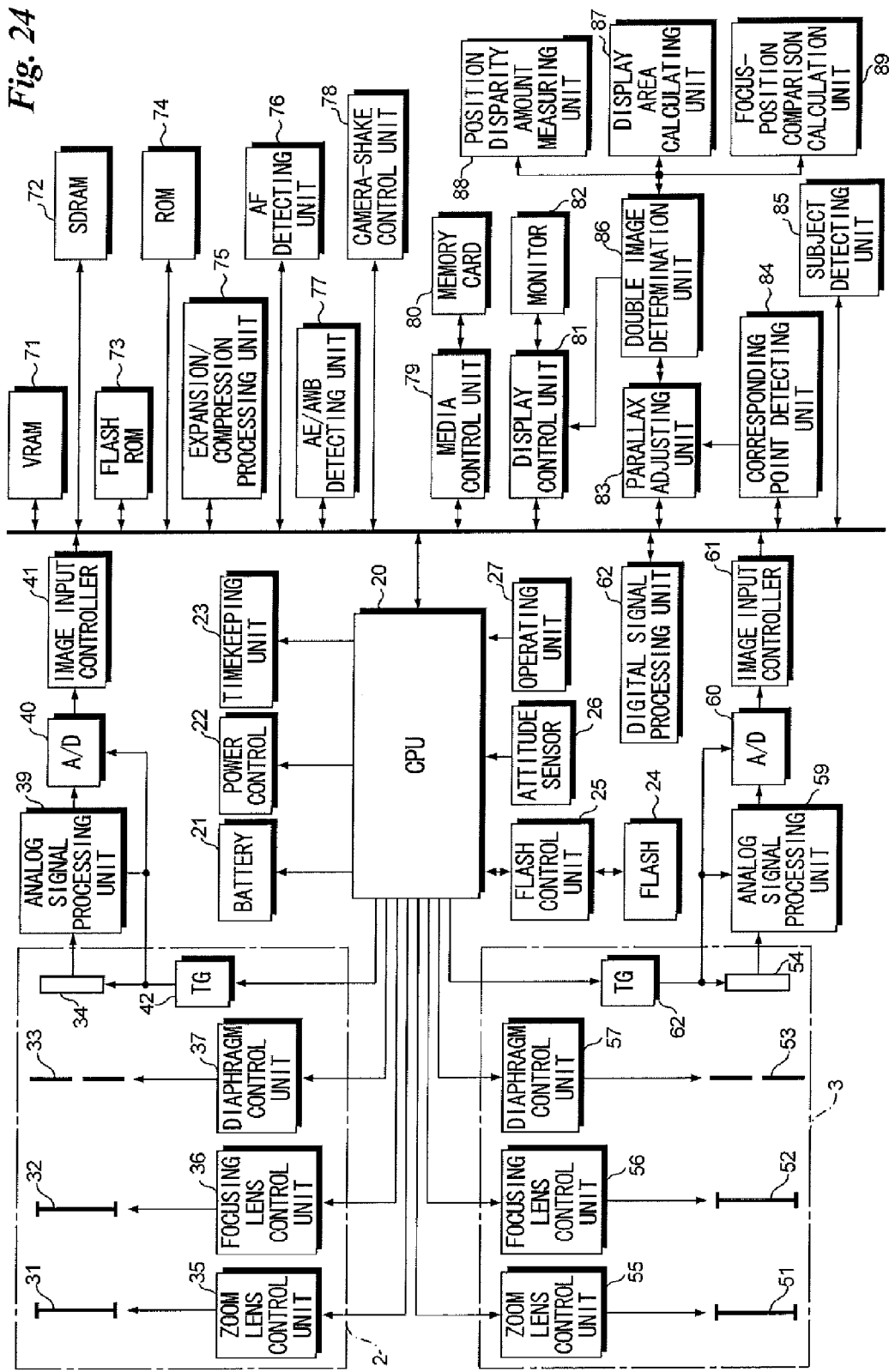
FIG. 24 is a block diagram illustrating the electrical configuration of a stereoscopic imaging digital camera.

FIG. 24 is a block diagram illustrating the electrical configuration of a stereoscopic imaging digital camera. Components in FIG. 24 identical with those shown in FIG. 6 are designated by like reference characters and need not be described again.

The stereoscopic imaging digital camera shown in FIG. 24 is provided with a focus-position comparison calculation unit 89. As shown in FIG. 18, the focus-position comparison calculation unit 89 compares the focusing lens position of the central portion in the image of the left-eye image and right-eye image in which an object image portion was detected and the focusing lens position of the detected object image portion, and calculates the positional relationship between the subject present at the central portion and the object represented by the detected object image portion. On the basis of the calculated positional relationship, an area for finding an object image portion is decided from the image in which the object image portion could not be detected.

Figure 25:
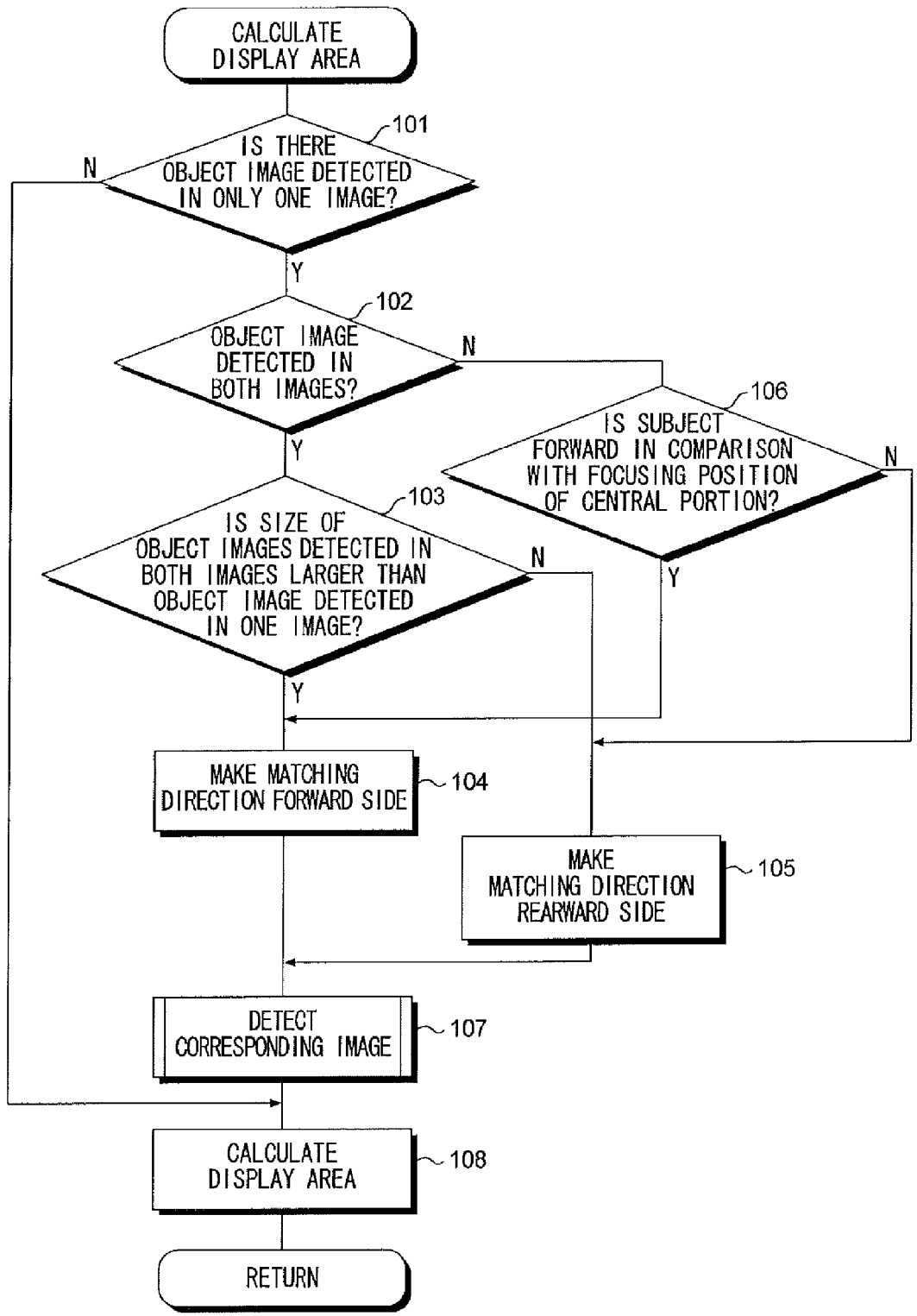
FIG. 25 is a flowchart illustrating a display area calculation processing procedure.

FIG. 25 is a flowchart illustrating a processing procedure (the processing procedure of step 95 in FIG. 7) for deciding the display area.

A check is made to determine whether there is an object image portion detected in only one image of left-eye and right-eye images (step 101). If there is an object image portion detected in only one image ("YES" at step 101), then a check is made to determine whether there are object image portions detected in both the left-eye and right-eye image (step 102).

If there are object image portions detected in both images ("YES" at step 102), then, as described with reference to FIG. 10, it is determined whether the size of the object image portions detected in both images is larger than the size of the object image portion detected only in the one image (step 103). If the size of the object image portions detected in both images is larger than the size of the object image portion detected only in the one image ("YES" at step 103), it is deemed that the object represented by the object image portion detected only in the one image is forward of the object represented by the object image portions detected in both images (the matching direction is made the forward side). As mentioned above, depending upon whether the image in which an object image portion could not be detected is the left-eye image or the right-eye image, the object image portion that could not be detected is found, in the one image in which the object image portion could not be detected, from a detection target zone that is set on the right side or left side of the position corresponding to the position at which the object image portion was detected in the other image (steps 104, 107). Here "matching" refers to a computational operation which, when a search is conducted for an object image that could be found in only one image of the left-eye and right-eye images, is for performing corresponding-point detection inside the other image by so-called pattern matching. Specifically, this is processing for detecting a face image in the manner described above with reference to FIG. 8 to FIGS. 22*a* and 22*b*.

If the size of the object image portions detected in both images is smaller than the size of the object image portion detected only in the one image ("NO" at step 103), it is deemed that the object represented by the object image portion detected only in the one image is rearward of the object represented by the object image portions detected in both images (the matching direction is made the rearward side). Therefore, as mentioned above, depending upon whether the image in which an object image portion could not be detected is the left-eye image or the right-eye image, the object image portion that could not be detected is found, in the one image in which the object image portion could not be detected, from a detection target zone that is set on the right side or left side of the position corresponding to the position at which the object image portion was detected in the other image (steps 105, 107).

If object image portions detected from both images do not exist ("NO" at step 102), then, as described with reference to FIG. 18, the range for finding the object image portion that could not be found is decided utilizing the positions of the focusing lenses.

If the position of the focusing lens of the object image portion detected from only the one image is forward in comparison with the position of the focusing lens of the central portion ("YES" at step 106), then it is deemed that the object represented by the object image portion detected only in the one image is forward of the subject present at the center (the matching direction is made the forward side). As mentioned above, the detection target zone is set and, depending upon whether the image in which the object image portion could not be detected is the left-eye image or the right-eye image, the object image portion that could not be detected is found, from the detection target zone, in the one image in which the object image portion could not be detected (steps 104, 107).

If the position of the focusing lens of the object image portion detected from only the one image is rearward in comparison with the position of the focusing lens of the central portion ("NO" at step 106), then it is deemed that the object represented by the object image portion detected only in the one image is rearward of the subject present at the center (the matching direction is made the rearward side). As mentioned above, the detection target zone is set and, depending upon whether the image in which the object image portion could not be detected is the left-eye image or the right-eye image, the object image portion that could not be detected is found, from the detection target zone, in the one image in which the object image portion could not be detected (steps 105, 107).

If an object image portion detected only in one image does not exist ("NO" at step 101), the processing of steps 102 to 107 is skipped.

A display area is calculated so as to contain all of the object image portions that have been found (detected) (step 108).

The foregoing embodiment detects a face image accurately and prevents forward double images. However, there are also cases, as when the macro mode is in effect, in which it is desired that forward double images not be eliminated. Such an embodiment will be described next.

FIGS. 26 to 33 illustrate another embodiment. This embodiment is such that if, even in a case where an object image portion has been detected, an image portion other than this object image portion is deemed to be the principal subject, then the left-eye image and right-eye image are shifted in such a manner that the visual disparity of this image portion is eliminated.

Figure 26:
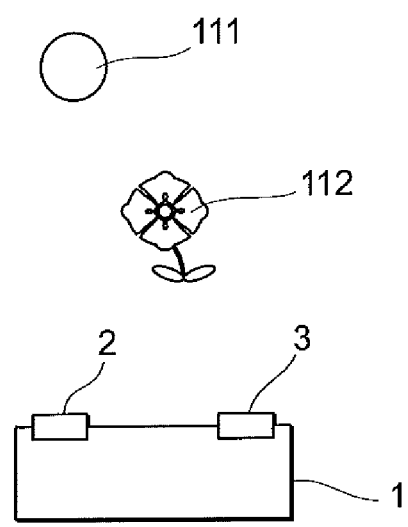
FIG. 26 illustrates the positional relationship between subject images and a stereoscopic imaging digital camera.

FIG. 26, which planarly illustrates the positional relationship between the stereoscopic imaging camera and subjects, corresponds to FIG. 1. Items in FIG. 26 identical with those shown in FIG. 1 are designated by like reference characters and need not be described again.

A person 111 and a flower 112 are in front of the stereoscopic imaging digital camera 1. The flower 112 is forward of the person 111. The flower 112 is substantially at the approximate center of the imaging zone in which imaging can be performed by the stereoscopic imaging digital camera 1.

Figure 27A:
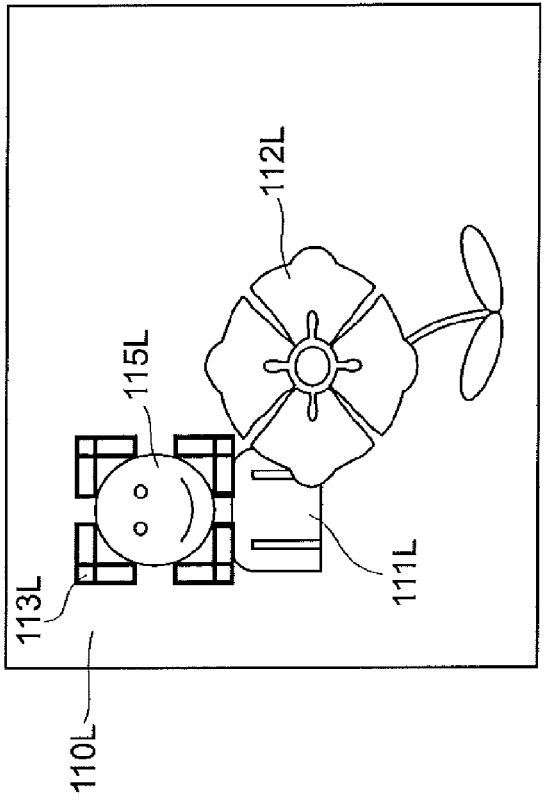
FIG. 27a illustrates a left-eye image and FIG. 27b a right-eye image.
Figure 27B:
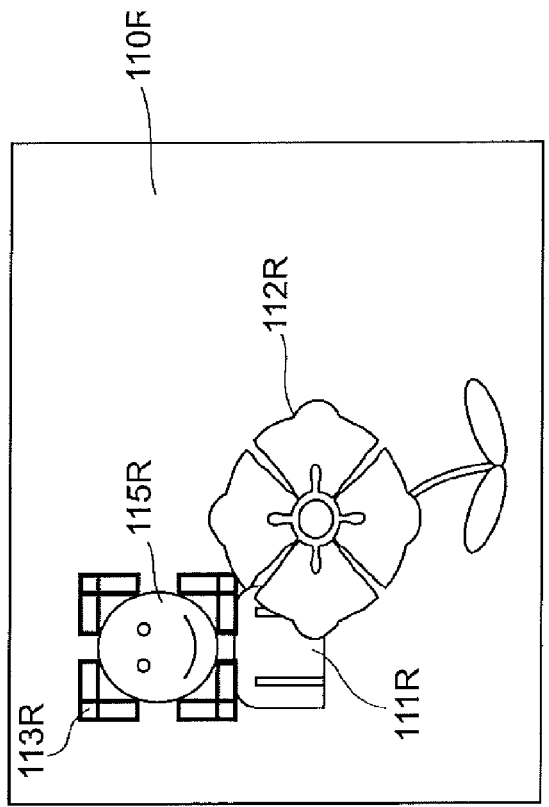

FIGS. 27*a* and 27*b* are examples of a left-eye image and right-eye image obtained in a case where the person 111 and flower 112 in the positional relationship shown in FIG. 26 have been imaged by the stereoscopic imaging digital camera 1.

With reference to FIG. 27*a*, a person image 111L representing the person 111 is displayed in a left-eye image 110L at the upper left thereof, and a flower image 112L representing the flower 112 is displayed in the left-eye image 110L at the approximate center thereof. By executing processing for detecting an object image portion, a face image 115L is detected and a frame 113L is displayed around the detected face image 115L.

With reference to FIG. 27*b*, a person image 111R representing the person 111 is displayed in a right-eye image 110R at the upper left thereof, and a flower image 112R representing the flower 112 is displayed in the right-eye image 110R at the approximate center thereof. By executing processing for detecting an object image portion, a face image 115R is detected and a frame 113R is displayed around the detected face image 115R.

Figure 28:
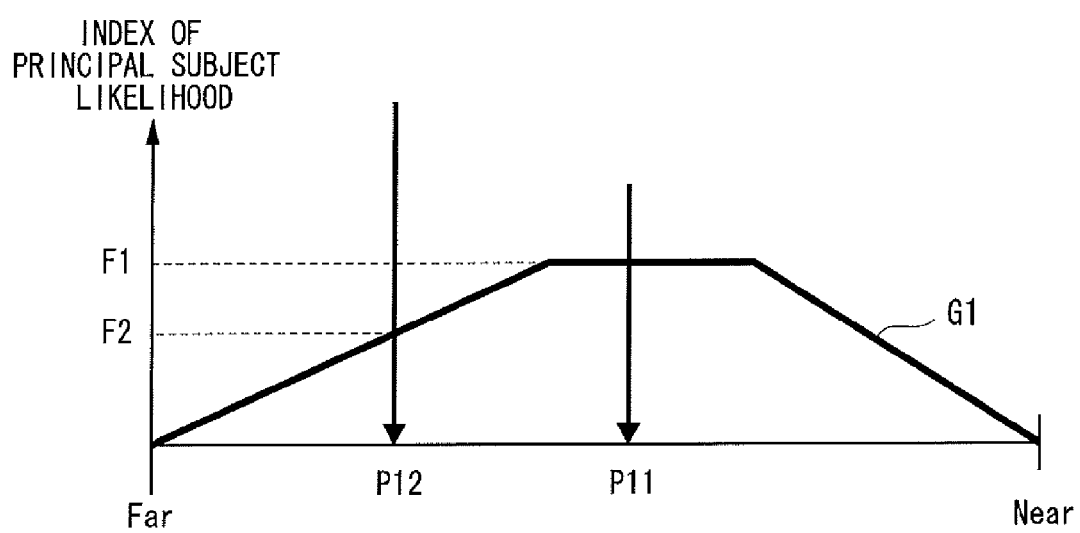
FIG. 28 illustrates the relationship among a focusing lens position of a central portion of an image, a focusing lens position of an object image portion and main subject likelihood.
Figure 29:
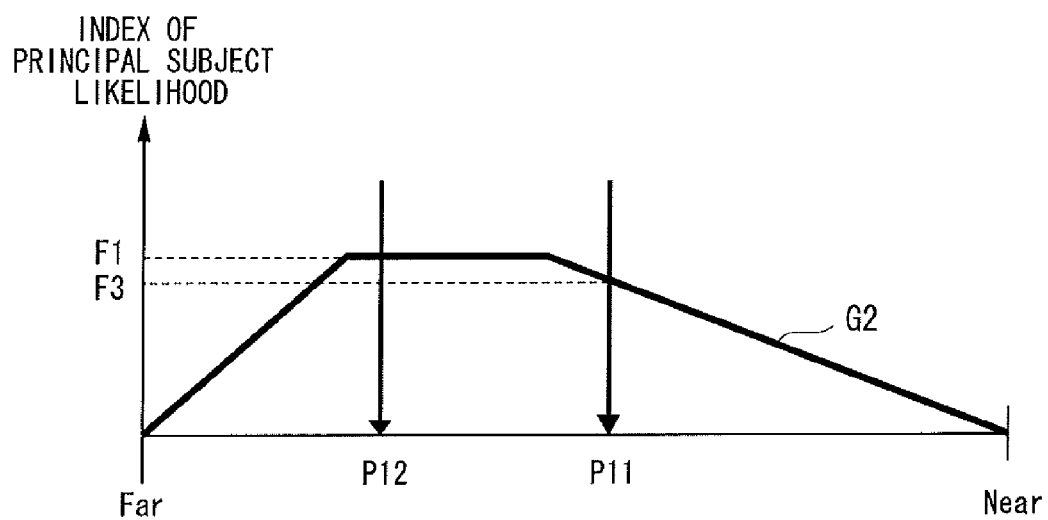
FIG. 29 illustrates the relationship among a focusing lens position of a central portion of an image, a focusing lens position of an object image portion and main subject likelihood.
Figure 30:
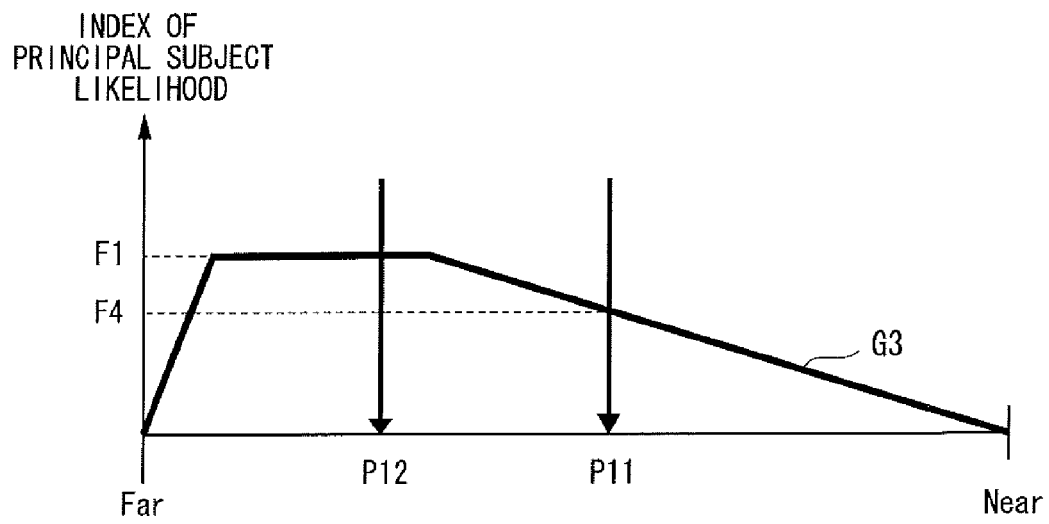
FIG. 30 illustrates the relationship among a focusing lens position of a central portion of an image, a focusing lens position of an object image portion and main subject likelihood.

FIGS. 28 to 30 illustrate the relationship among the focusing position of the imaging lens when an object image portion is detected, the focusing position of the imaging lens at the central portion and an index representing principal subject likelihood. FIG. 28 shows a graph G1 of the relationship in a case where the zoom lens has been set on the wide-angle side, FIG. 29 shows a graph G2 of the relationship in a case where the zoom lens has been set intermediate the wide-angle side and the telephoto side, and FIG. 30 shows a graph G3 of the relationship in a case where the zoom lens has been set on the telephoto side.

An index FP representing principle subject likelihood has been stored beforehand, for each zoom position, in correspondence with the zoom position of the zoom lens. If the zoom lens is on the wide-angle side, the graph G1 in which the "Near" side is the maximum value is obtained, as shown in FIG. 28. If the zoom lens is intermediate the wide-angle side and the telephoto side, the graph G2 in which the approximate section between the "Near" and "Far" sides is the maximum value is obtained, as shown in FIG. 29. If the zoom lens is on the telephoto side, the graph G3 in which the "Far" side is the maximum value is obtained, as shown in FIG. 30. The graphs indicating these relationship between the focusing lens positions and the index of principal subject likelihood vary continuously in accordance with the zoom position. Graphs illustrating the relationship between the focusing lens positions and the index of principal subject likelihood are stored beforehand in accordance with zoom position (actually these are stored in table form), the graph corresponding to the set zoom position is selected from among these graphs, and the selected graph is used to calculate the index representing principal subject likelihood when the focusing position of the imaging lens prevailing at detection of the object image portion and the focusing position of the imaging lens of the central portion are decided.

Assume that the position of the focusing lens when the object image portion is detected is P12 and that the position of the focusing lens when the subject at the central portion is brought into focus is P11.

Assume the case where the zoom position is on the wide-angle side. When, with use of graph G1 shown in FIG. 28, the positions P11 and P12 of the focusing lenses are extended perpendicularly, the indices at the intersections with graph G1 become the respective principal subject likelihoods. The index representing the principal subject likelihood of the subject at the central portion is F1, and the index representing the principal subject likelihood of the object image portion is F2. Since F1>F2 holds, it is deemed that the subject at the central portion is more likely to be the principal subject than the object represented by the object image portion.

In a case where the zoom position is the intermediate position and the graph G2 shown in FIG. 29 is used, the index representing the principal subject likelihood of the subject at the central portion is F3 and the index representing the principal subject likelihood of the object image portion is F1. Since F1>F3 holds, it is deemed that the object represented by the object image portion is more likely to be the principal subject than the subject at the central portion.

In a case where the zoom position is on the telephoto side, use is made of the graph G3 shown in FIG. 30, the index representing the principal subject likelihood of the subject at the central portion is F4 and the index representing the principal subject likelihood of the object image portion is F1. Since F1>F4 holds, it is deemed that the object represented by the object image portion is more likely to be the principal subject than the subject at the central portion.

In a case where the user performs imaging aiming at a subject a short distance away, as in the macro mode in which the zoom lens is set on the wide-angle side, the parallax of this subject is eliminated and elimination of the forward double image is not carried out.

Figure 31:
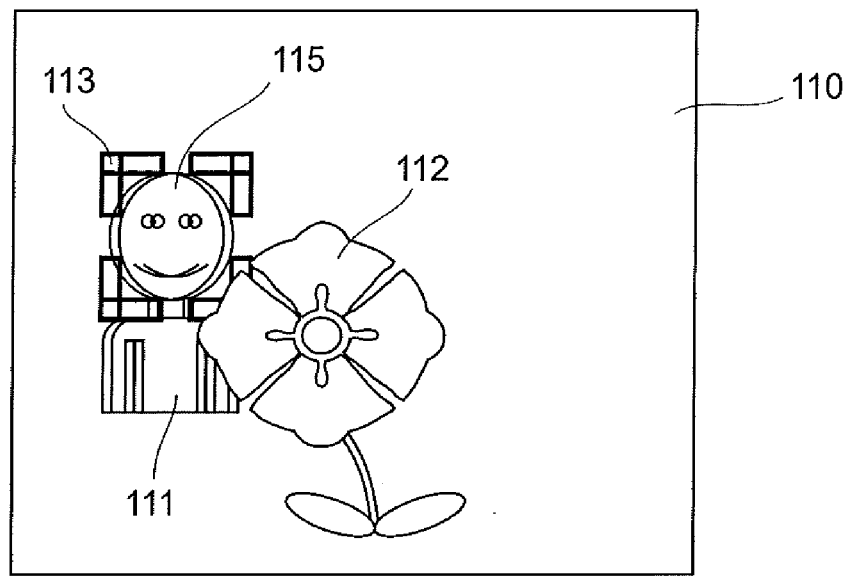
FIG. 31 is an example of a stereoscopic image.

FIG. 31 is an example of a stereoscopic image 110 that is the result of superimposing the left-eye image and right-eye image shown in FIGS. 27a and 27b.

The stereoscopic image 110 contains a person image 111 representing the person and a flower image 112 representing the flower 112. (Here it is assumed that the reference characters of the person image 111 and flower image 112 are the same as those of the person 111 and flower 112.) The face image 115 of the person image 111 has been detected, and the frame 113 is being displayed around the face image 115.

In this embodiment, the macro mode has been set and the index F1 of principal subject likelihood of the flower image 112 is larger than the index F2 of principal subject likelihood of the person image 111, as shown in FIG. 28. Therefore, the left-eye image 110L and right-eye image 110R are not shifted in such a manner that the person image 111 will not develop visual disparity but are instead shifted in such a manner that the flower image 112, which is deemed to be the principal subject, will not develop visual disparity. Thus the flower image 112 contained in the stereoscopic image 110 has its visual disparity eliminated.

Figure 32:
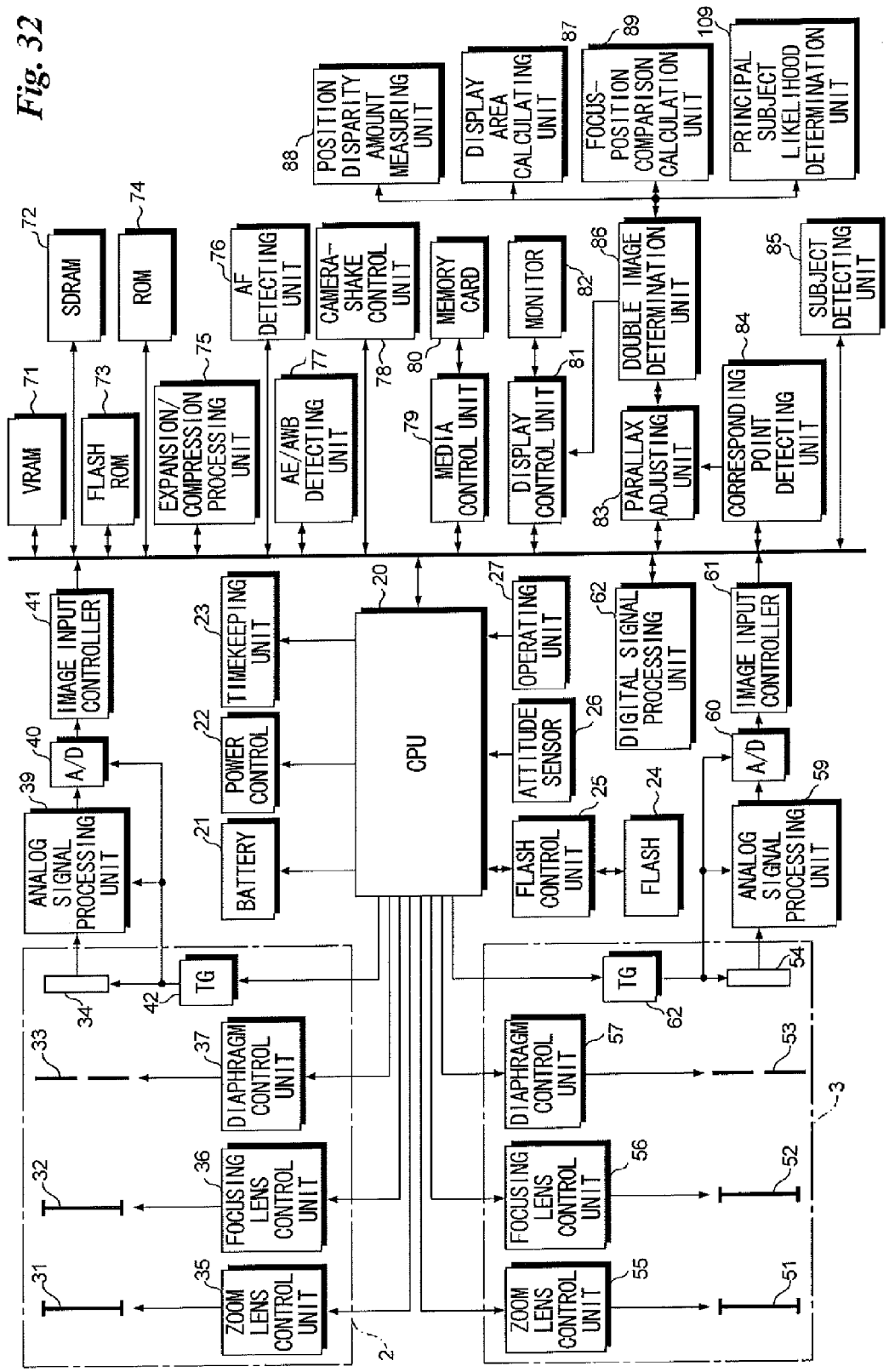
FIG. 32 is a block diagram illustrating the electrical configuration of a stereoscopic imaging digital camera.

FIG. 32 is a block diagram illustrating the electrical configuration of a stereoscopic imaging digital camera. Components in FIG. 32 identical with those shown in FIG. 24 are designated by like reference characters and need not be described again.

The stereoscopic imaging digital camera 1 shown in FIG. 32 is provided with a principal subject likelihood determination unit 109. The index of principal subject likelihood of an image present at the center of an image and the index of principal subject likelihood of a detected object image portion are compared, as set forth above, in the principal subject likelihood determination unit 109, and the left-eye image and right-eye image are shifted in such a manner that the visual disparity of the image having the high index of principal subject likelihood is eliminated.

Figure 33:
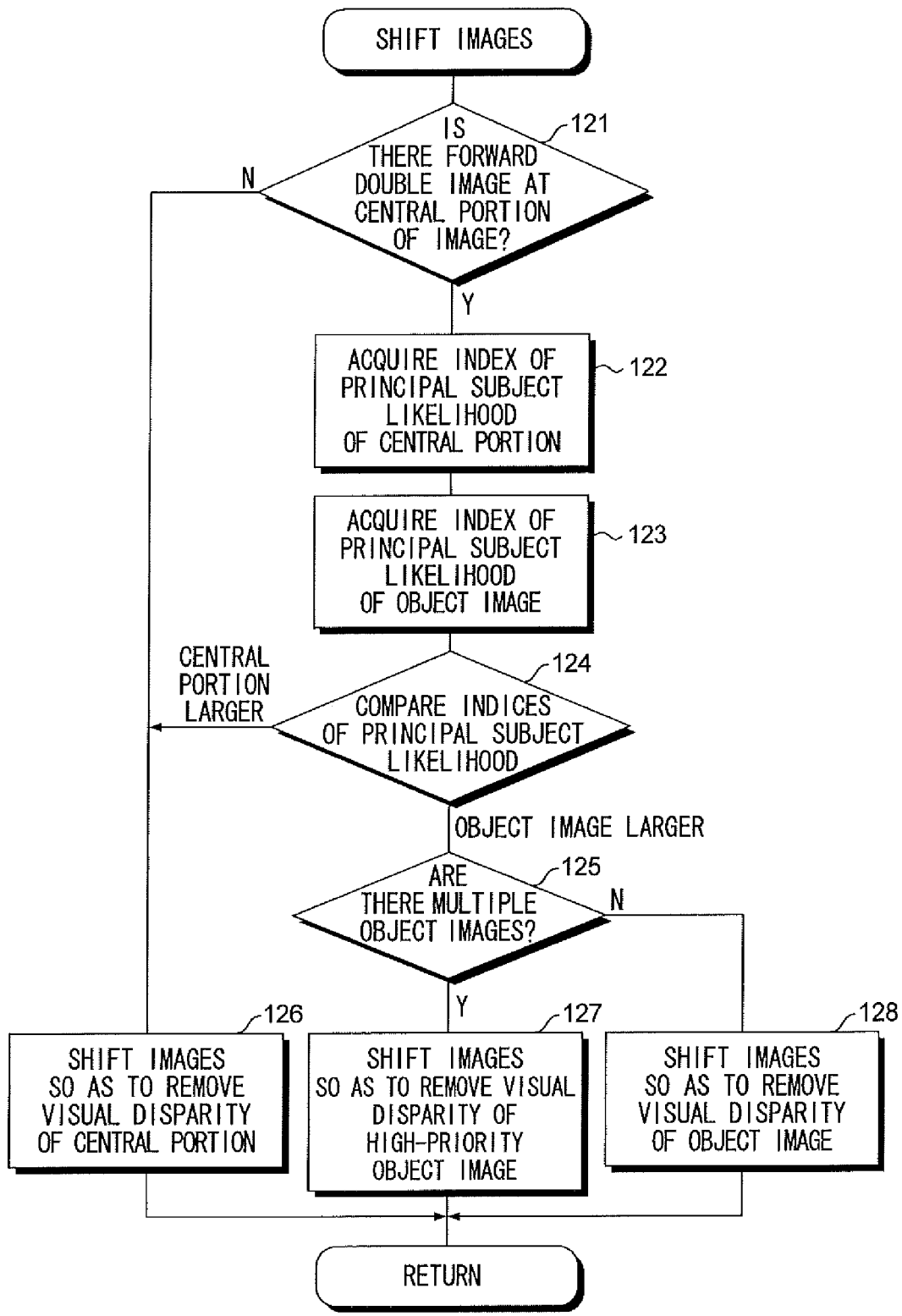
FIG. 33 is a flowchart illustrating an image shifting processing procedure.

FIG. 33 is a flowchart illustrating the processing procedure (the processing procedure at step 92 in FIG. 7) for shifting the left-eye and right-eye images.

It is determined whether there is a double image at the central portion of the stereoscopic image obtained by superimposing the left-eye image and the right-eye image (step 121). If there is a double image at the central portion ("YES" at step 121), then the index of principal subject likelihood of the double image at the central portion is calculated as set forth above (step 122). Next, the index of principal subject likelihood of the detected object image portion also is calculated (step 123).

The calculated indices of principal subject likelihood are compared (step 124). If the index of principal subject likelihood of the double image at the center is larger than the principal subject likelihood of the detected object image portion (CENTRAL PORTION LARGER), then the left-eye image and right-eye image are shifted so as to remove the visual disparity of the double image at the central portion (step 126). Conversely, if the index of principal subject likelihood of the double image at the central portion is larger (OBJECT IMAGE LARGER) than the index of principal subject likelihood of the detected object image portion, then a check is made to determine whether a plurality of object image portions exist (step 125). If a plurality of object image portions exist (step 124), the left-eye image and right-eye image are shifted in such a manner that the visual disparity of the object image portion having the high priority is removed (step 127). The priority can be the order of decreasing size of the detected object image portions, the order of decreasing nearness to the center with regard to the positions of the detected object image portions, and the like, and it goes without saying that the priority is set in advance. If a plurality of object image portions do not exist ("NO" at step 124), then the left-eye image and right-eye image are shifted in such a manner that visual disparity of the detected object image portion is removed (step 128).

Although the foregoing embodiment takes so-called auto-playback into consideration, there are also cases where a user performs playback utilizing manual zoom. Even in such a case it is preferred that an excellent image, which exhibits little visual disparity and subjects the eyes of the user to little strain, be reproduced in accordance with the zoom operation. Such an embodiment will be set forth next.

FIGS. 34 to 37 illustrate another embodiment. This embodiment pertains to electronic zoom processing at the time of playback.

Figure 34:
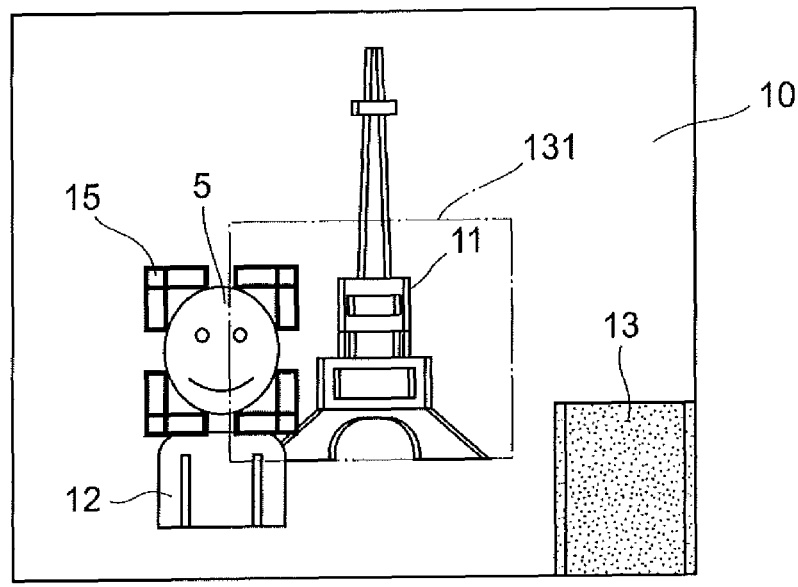
FIG. 34 is an example of a stereoscopic image.
Figure 35:
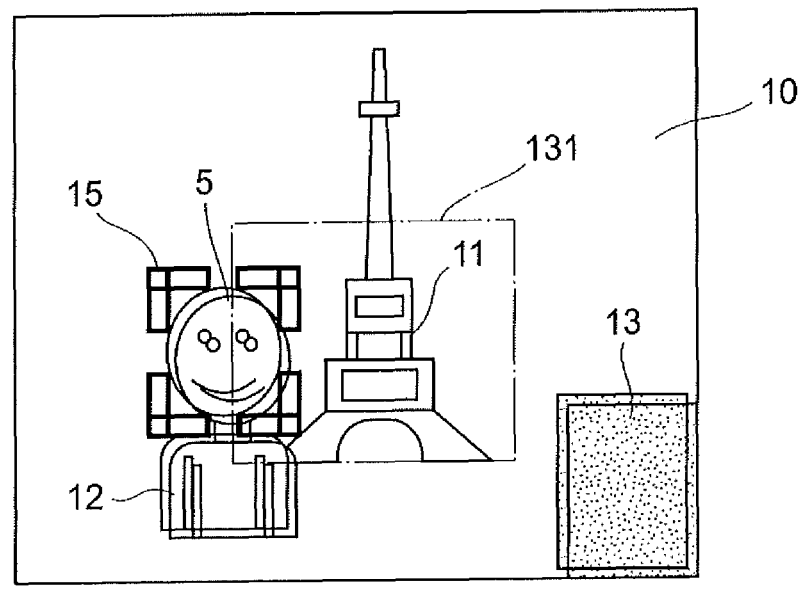
FIG. 35 is an example of a stereoscopic image.

FIGS. 34 and 35 are examples of stereoscopic images (images obtained as a result of superimposing left-eye and right-eye images). FIG. 34 is a stereoscopic image in which visual disparity of object image portion 5 has been removed, and FIG. 35 is a stereoscopic image in which visual disparity of centrally located tower image 11 has been removed. These Figures have been obtained by imaging the subjects in the positional relationship shown in FIG. 1, and items in FIGS. 34 and 35 identical with those shown in FIG. 4 are designated by like reference characters and need not be described again.

In a case where electronic zoom processing is carried out at the time of playback, a zoom area 131 is designated, as shown in FIGS. 34 and 35. The zoom area 131 is designated utilizing the operating unit 27 included in the stereoscopic imaging digital camera 1. Enlargement processing is executed in such a manner that the image within the designated zoom area 131 will be displayed over the entire display screen.

When electronic zoom processing is executed as described above in a case where an object image portion is detected at the time of playback and the stereoscopic image is displayed upon shifting the left-eye and right-eye images in such a manner that visual disparity of the detected object image portion is eliminated, there will be occasions where the object image portion will fall outside the designated zoom area 131. If electronic zoom processing is executed under such circumstances, the enlarged stereoscopic image that will be displayed will not contain the object image portion from which visual disparity has been removed, as shown in FIG. 34. For this reason, this embodiment is such that in a case where the detected object image portion falls outside the zoom area 131, the left-eye and right-eye images are shifted in such a manner that visual disparity of the image portion (tower image 11) present at the central portion is eliminated, as shown in FIG. 35.

Figure 36:
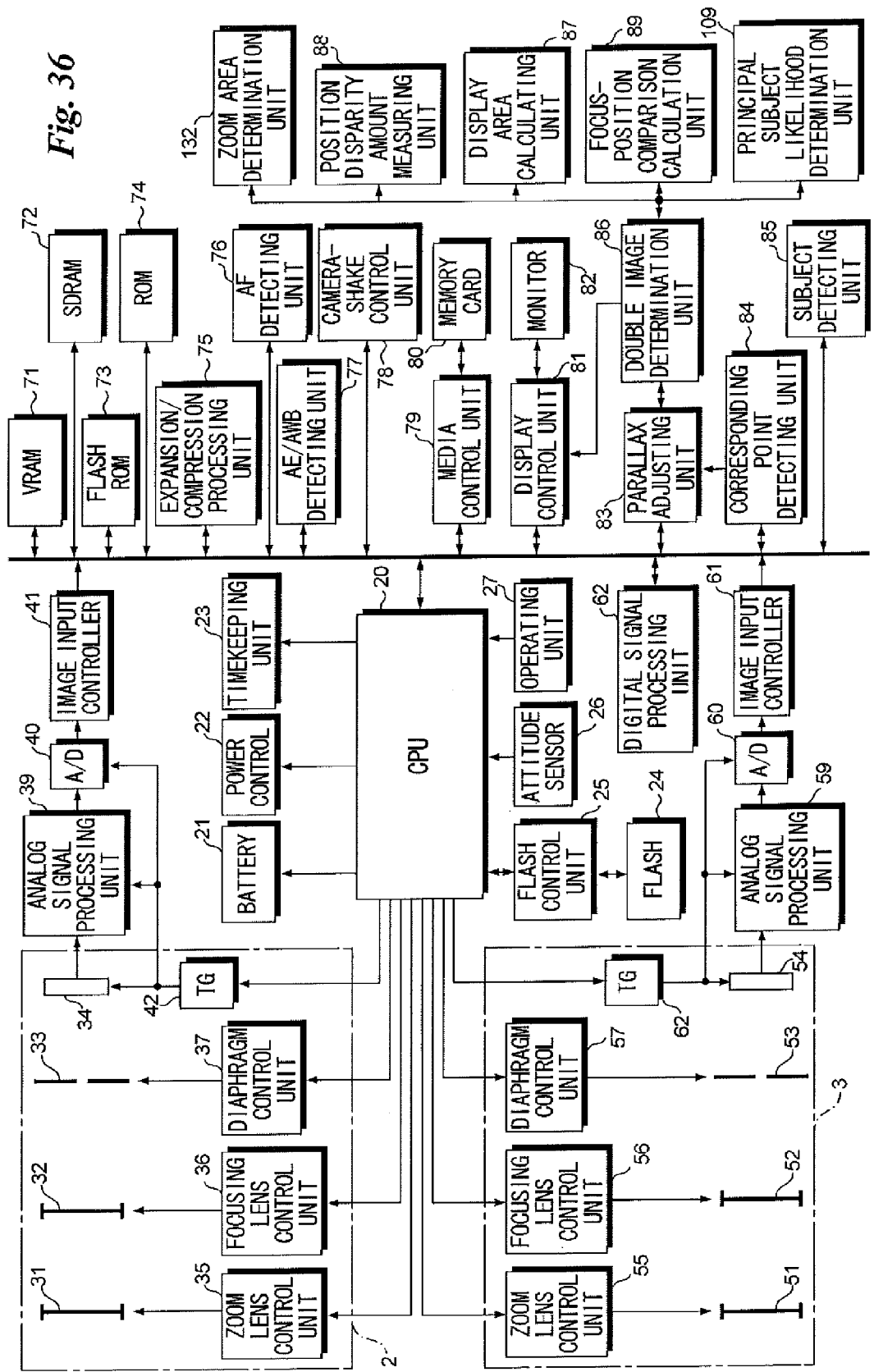
FIG. 36 is a flowchart illustrating the processing procedure of a stereoscopic imaging digital camera.

FIG. 36 is a block diagram illustrating the electrical configuration of a stereoscopic imaging digital camera. Components in FIG. 36 identical with those shown in FIG. 32 are designated by like reference characters and need not be described again.

The stereoscopic imaging digital camera shown in FIG. 36 includes a zoom area determination unit 132. The zoom area determination unit 132 determines whether an object image portion is included within the designated zoom area, as mentioned above. If an object image portion is not included within the zoom area, the left-eye and right-eye images are shifted in such a manner that the visual disparity of the image at the center of the image or at the center of the zoom area is removed, and the image within the zoom area is enlarged.

Figure 37:
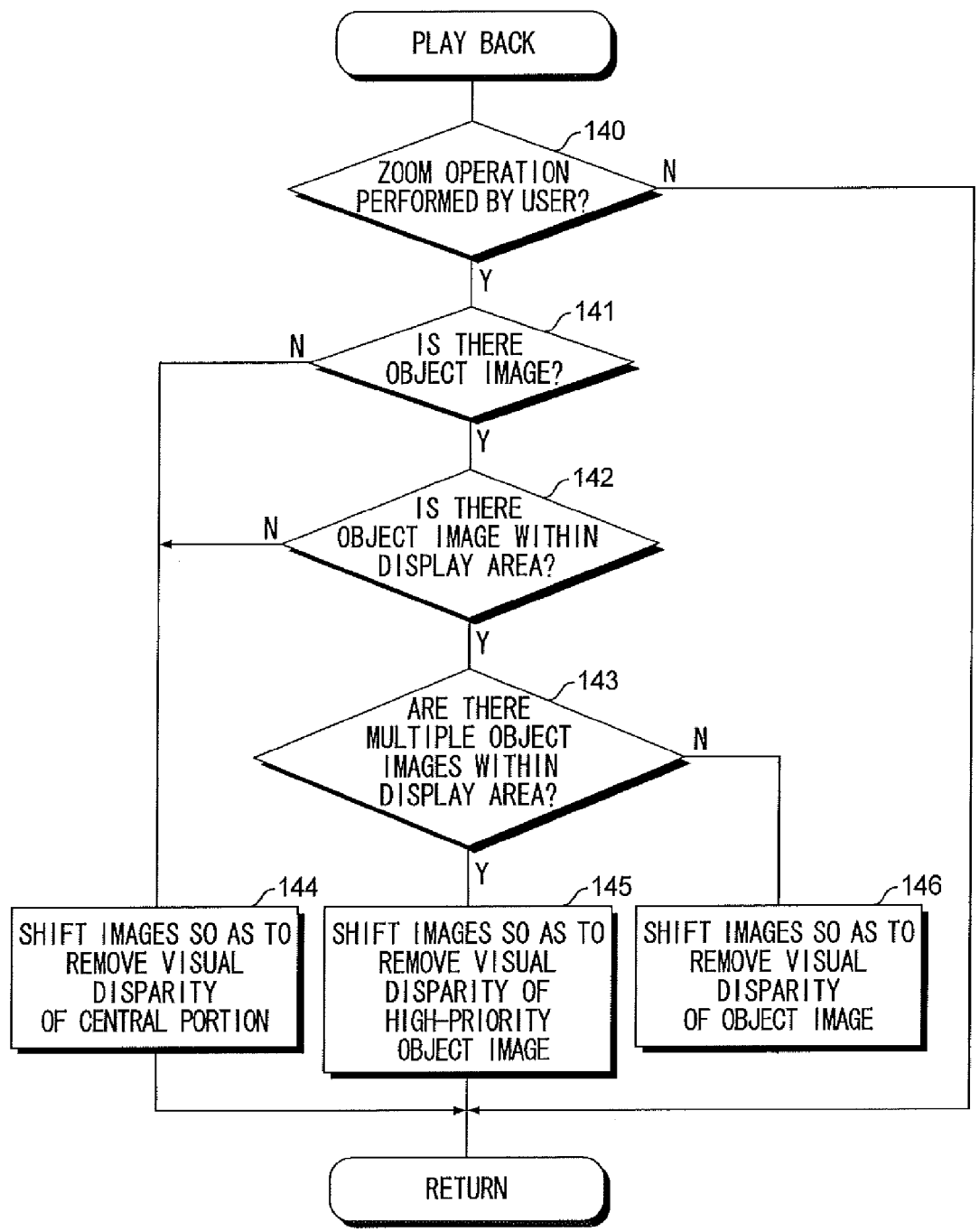
FIG. 37 is a flowchart illustrating a playback processing procedure.

FIG. 37 is a flowchart illustrating a playback processing procedure based upon electronic zoom.

Items of left-eye image data and right-eye image data are read out of the memory card 80 and detection processing is executed for detecting object image portions from respective ones of the left-eye and right-eye images represented by the left-eye image data and right-eye image data. It may be arranged so that detection processing is executed for detecting an object image portion from either one of the left-eye and right-eye images. The stereoscopic image composed of the left-eye image and right-eye image is displayed on the display screen of the monitor display unit 82 and the electronic zoom area is designated.

When a zoom operation (manual zoom operation) is performed by the user ("YES" at step 140), processing for determining whether an object image exists in the stereoscopic image is executed. If there is an object image portion in the stereoscopic image ("YES" at step 141), then it is determined whether the detected object image portion is within the designated electronic zoom area (step 142).

If the detected object image portion is within the designated electronic zoom area ("YES" at step 142), a check is made to determine whether a plurality of object image portions are contained in the display area (step 143).

In a case where a plurality of object image portions exist ("YES" at step 143), the left-eye and right-eye images are shifted in such a manner that visual disparity of the high-priority object image portion is removed in a manner similar to that described above (step 145). In a case where a plurality of object image portions do not exist ("N" at step 143), the left-eye and right-eye images are shifted in such a manner that visual disparity of the detected object image portion is removed (step 146).

In a case where a plurality of object image portions do not exist in the stereoscopic image ("NO" at step 141), or in a case where the detected object image portion is not inside the designated electronic zoom area ("NO" at step 142), then the left-eye and right-eye images are displayed upon being shifted in such a manner that visual disparity of the image at the central portion of the stereoscopic image or at the central portion of the electronic zoom area is removed (step 144), as mentioned above.

If a zoom operation by the user is not performed ("NO" at step 140), then the above-described processing of steps 141 to 146 is skipped. Processing for changing visual disparity is not carried out.

FIGS. 38 to 42 illustrate another embodiment. In the prints of stereoscopic images, portions such as forward double images which are obtrusive and impose strain upon the eyes when viewed are eliminated. This enables the provision of a system for providing prints which have little visual disparity and which will not fatigue the eyes of the user. In this embodiment, data representing a portion from which the amount of visual disparity is removed and data representing a display area is recorded on the memory card 80, as described above. The data representing a portion from which the amount of visual disparity is removed and data representing a display area may be recorded on the memory card 80 together with left-eye image and right-eye image obtained by imaging, or it may be arranged so that it is recorded on the memory card 80 on which the left-eye and right-eye image data has already been recorded.

Figure 38:
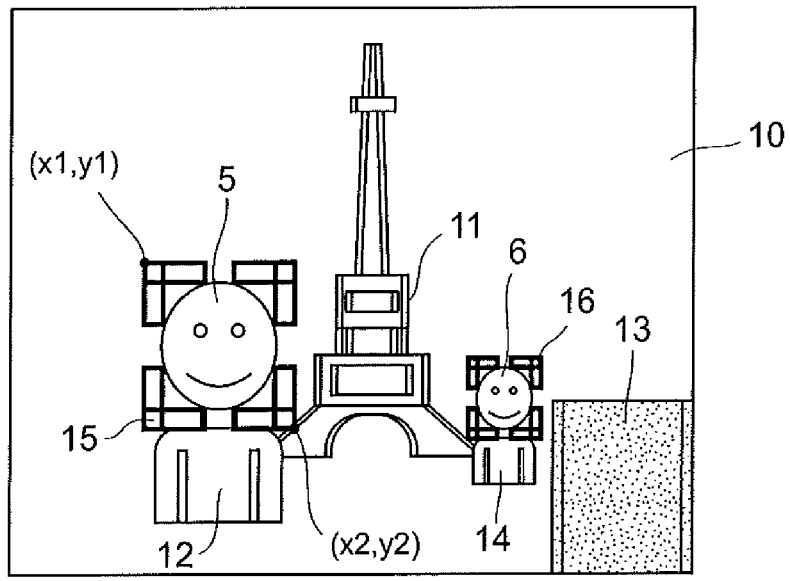
FIG. 38 is an example of a stereoscopic image.

FIG. 38 is an example of the stereoscopic image 10. FIG. 38 corresponds to FIG. 23, and items in FIG. 38 identical with those shown in FIG. 23 are designated by like reference characters and need not be described again.

With reference to FIG. 38, if the display is to be presented in such a manner that visual disparity of face image 5 of first person 12 included in the stereoscopic image 10 is eliminated, then data indicating coordinates (x1,y1) of the upper-left corner and data indicating coordinates (x2,y2) of the lower-right corner of rectangular frame 15 enclosing the face image 5 is adopted as data representing the portion the visual disparity of which is to be removed.

Figure 39:
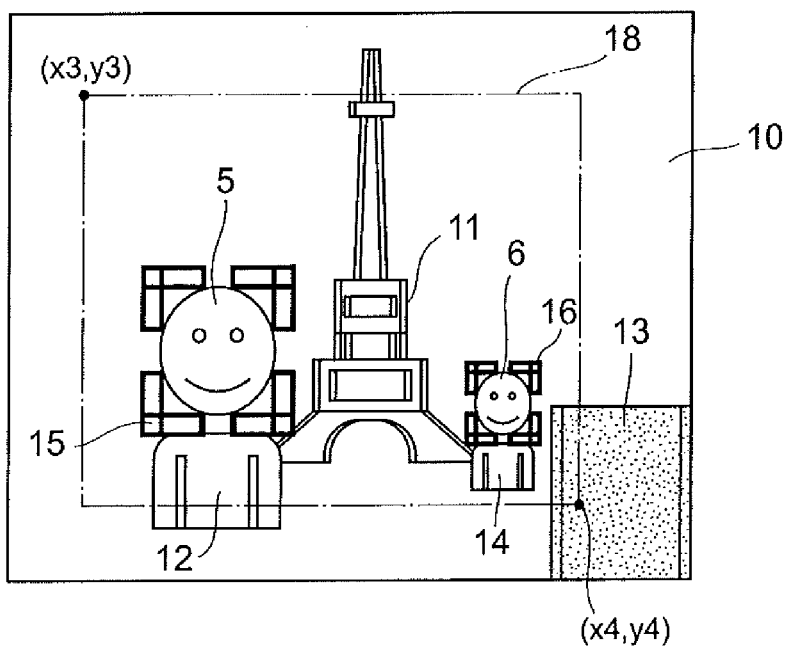
FIG. 39 is an example of a stereoscopic image.

FIG. 39 is an example of the stereoscopic image 10. FIG. 39 corresponds to FIG. 23, and items in FIG. 39 identical with those shown in FIG. 23 are designated by like reference characters and need not be described again.

The face image 5 of first person 12 and the face image 6 of second person 14 have been detected in the stereoscopic image 10, and rectangular display area 18 is decided so as to include the face image 5. Data indicating coordinates (x3,y3) of the upper-left corner and data indicating coordinates (x4, y4) of the lower-right corner of the display area 18 enclosing the face image 5 is adopted as data representing the display area 18.

These items of data are recorded on the memory card 80 (as by being recorded in the header area of the memory card 80) as data representing the portion from which visual disparity will be removed and data representing the display area.

The memory card 80 on which has been recorded the data representing the portion from which visual disparity will be removed and the data representing the display area as well as the left-eye and right-eye image data is taken to a photo lab. By reading out the data representing the portion from which visual disparity is to be removed, this image portion whose visual disparity is to be removed from the stereoscopic image can be ascertained. A stereoscopic image in which visual disparity of this image portion is be eliminated can be printed. Furthermore, the display area in the stereoscopic image can be ascertained by reading the data representing the display area from the memory card 80. The image within the display area can be printed out as a single image print.

Figure 40:
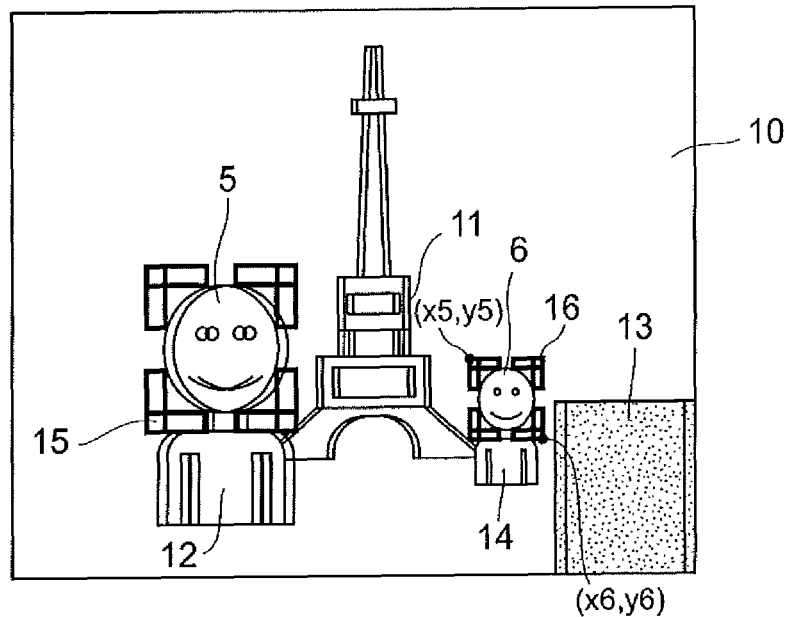
FIG. 40 is an example of a stereoscopic image.

FIG. 40 is an example of the stereoscopic image 10. FIG. 40 corresponds to FIG. 23, and items in FIG. 40 identical with those shown in FIG. 23 are designated by like reference characters and need not be described again.

With reference to FIG. 40, if the display is to be presented in such a manner that visual disparity of face image 6 of second person 14 included in the stereoscopic image 10 is eliminated, data indicating coordinates (x5,y5) of the upper-left corner and data indicating coordinates (x6,y6) of the lower-right corner of rectangular frame 16 enclosing the face image 6 is adopted as data representing the portion the visual disparity of which is to be removed.

Figure 41:
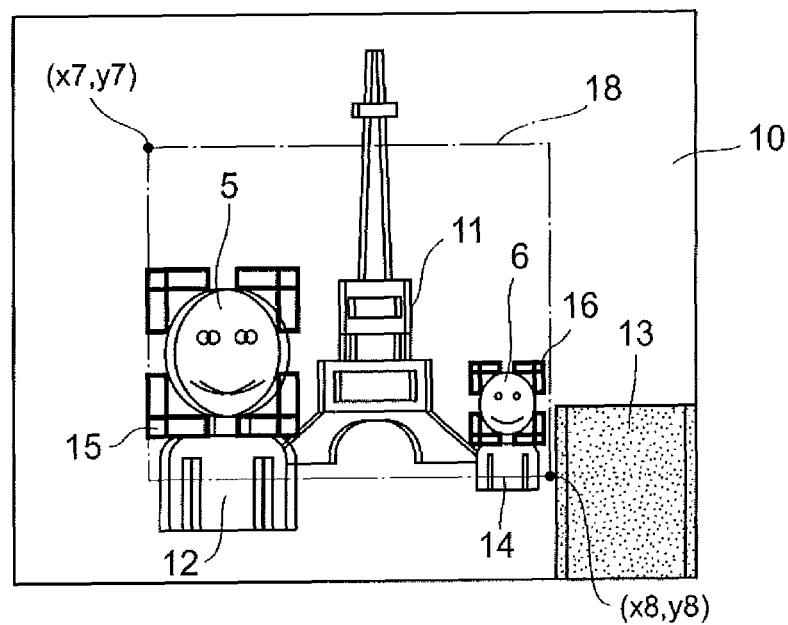
FIG. 41 is an example of a stereoscopic image.

FIG. 41 is an example of the stereoscopic image 10. FIG. 41 corresponds to FIG. 23, and items in FIG. 41 identical with those shown in FIG. 23 are designated by like reference characters and need not be described again.

The face image 5 of first person 12 and the face image 6 of second person 14 have been detected in the stereoscopic image 10, and rectangular display area 18 is decided so as to include the face image 6. Data indicating coordinates (x7,y7) of the upper-left corner and data indicating coordinates (x8, y8) of the lower-right corner of the display area 18 is adopted as data representing the display area 18.

In a manner similar to that described above, these items of data are recorded on the memory card 80 as data representing the portion from which visual disparity will be removed and data representing the display area.

In a manner similar to that described above, the memory card 80 on which has been recorded the data representing the portion from which visual disparity will be removed and the data representing the display area as well as the left-eye and right-eye image data is taken to a photo lab. By reading out the data representing the portion from which visual disparity is to be removed, this image portion whose visual disparity is to be removed from the stereoscopic image can be ascertained. A stereoscopic image in which visual disparity of this image portion is be eliminated can be printed. Furthermore, the display area in the stereoscopic image can be ascertained by reading the data representing the display area from the memory card 80. The image within the display area can be printed out as a single image print.

In the foregoing embodiment, the portion from which visual disparity is eliminated and the display area are taken as coordinates in the stereoscopic image 10. In actuality, however, since a stereoscopic image is composed of a left-eye image and a right-eye image, coordinates indicating the portion whose visual disparity is eliminated and coordinates indicating the display area in each of the left-eye and right-eye images are recorded on the memory card 80.

Figure 42:
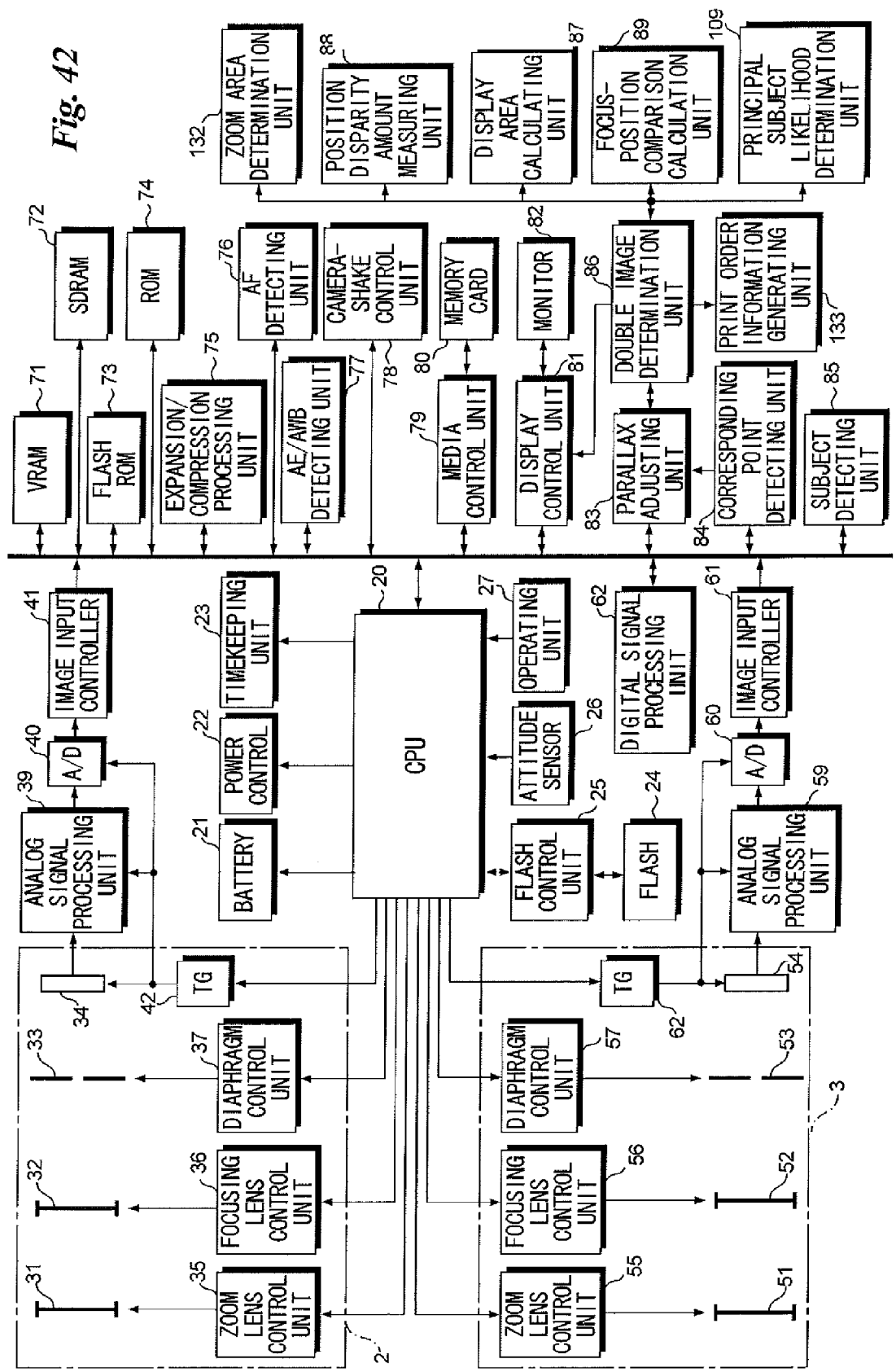
FIG. 42 is a block diagram illustrating the electrical configuration of a stereoscopic imaging digital camera.

FIG. 42 is a block diagram illustrating the electrical configuration of a stereoscopic imaging digital camera. Components in FIG. 42 identical with those shown in FIG. 36 are designated by like reference characters and need not be described again.

The stereoscopic imaging digital camera shown in FIG. 42 is provided with a print order information generating unit 133. The print order information generating unit 133 generates information relating to prints of stereoscopic images. A stereoscopic image to be printed is displayed on the monitor display unit 82. In addition to data (e.g., frame number data) specifying the stereoscopic image (left-eye image and right-eye image) displayed on the monitor display unit 82, data indicating the image portion whose visual disparity is to be eliminated and data representing the display area, as mentioned above, is generated as print order information. The print order information generated is recorded on the memory card 80 and the stereoscopic image is printed in accordance with this print order information.

The invention claimed is:

1. A stereoscopic image display apparatus comprising:
   a first object image portion detection hardware processing unit configured to find a desired object image portion from a left-eye image and from a right-eye image constituting a stereoscopic image;
   a parallax shifting hardware processing unit configured to shift said left-eye image and said right-eye image in such a manner that visual disparity between the object image portion of said left-eye image and the object image portion of said right-eye image, which have been found in said first object image portion detection hardware processing unit, is removed;
   a display area decision hardware processing unit configured to decide a display area extraction amount from the left-eye image and the right-eye image, the extraction amount containing the desired object image portion the visual disparity of which has been removed by said parallax shifting hardware processing unit, in said left-eye image and in said right-eye image that have been shifted by said parallax shifting hardware processing unit;
   a display control hardware processing unit configured to control a display unit so as to enlarge and display the image within the display area, which has been decided by said display area decision hardware processing unit, in said left-eye image and in said right-eye image that have been shifted by said parallax shifting hardware processing device;
   a first determination hardware processing unit configured to determine whether a forward subject image representing a subject present in front of the desired object represented by the desired object image portion detected by said first object image portion detection hardware processing unit is contained in said left-eye image and in said right-eye image; and
   a second determination hardware processing unit, responsive to a determination made by said first determination hardware processing unit that the forward subject image is contained in said left-eye image and in said right-eye image, said second determination hardware processing unit configured to determine whether amount of disparity between the forward subject image contained in said left-eye image and the forward subject image contained in said right-eye image is outside an allowable range;
   wherein said display area decision hardware processing unit decides said display area extraction amount from the left-eye image and the right-eye image in accordance with a determination made by said second determination hardware processing unit that the amount of disparity of the forward object is outside the allowable range; and
   a monitor to display the extracted amount from the right-eye and left-eye image as a result of the display area decision hardware processing unit, said extracted amount including the desired object portion and minimizing a displayed amount of the forward object with disparity outside the allowable range.

2. The stereoscopic image control apparatus according to claim 1, further comprising:
   a first determination device for determining whether a forward subject image representing a subject present in front of the object represented by the object image portion detected by said first object image portion detection device is contained in said left-eye image and in said right-eye image; and
   a second determination device, responsive to a determination made by said first determination device that the forward subject image is contained in said left-eye image and in said right-eye image, for determining whether amount of disparity between the forward subject image contained in said left-eye image and the forward subject image contained in said right-eye image is outside an allowable range;
   wherein said display area decision device decides said image area in accordance with a determination made by said second determination device that the amount of disparity is outside the allowable range.

3. The stereoscopic display apparatus of claim 1, wherein the display area decision hardware processing unit determines an amount of enlargement for the left-eye image and the right-eye image containing the desired object when the disparity between the forward subject image contained in the left-eye image and the forward subject image contained in the right-eye image is outside the allowable range.

4. A method of controlling operation of a stereoscopic image control apparatus, comprising:
   finding a desired object image portion from a left-eye image and from a right-eye image constituting a stereoscopic image using an object image portion detection hardware processing unit;
   shifting said left-eye image and said right-eye image in such a manner that visual disparity between the object image portion of said left-eye image and the object image portion of said right-eye image, which have been found in said object image portion detection hardware processing unit, is removed, said shifting being performed using a parallax shifting hardware processing unit;
   deciding a display area, which contains the object image portion the visual disparity of which has been removed by said parallax shifting hardware processing unit, in said left-eye image and said right-eye image that have been shifted by said parallax shifting hardware processing unit, said deciding being performed using a display area decision hardware processing unit;
   determining whether a forward object, representing a subject in front of the desired object image, is contained in said left-eye image and said right-eye image, further determining whether a disparity of the forward object contained in said right-eye image and forward object contained in said left-eye image is outside an allowable range, said determining being performed by a determination hardware processing unit; and
   controlling a display so as to enlarge and display the image within the display area, which has been decided by said display area decision hardware processing unit, in said left-eye image and in said right-eye image that have been shifted by said parallax shifting hardware processing unit, and said display area is further determined based on whether a disparity of the forward object is outside the allowable range; and
   displaying the decided display area on a monitor.

5. A non-transitory computer-readable readable medium having a program for controlling operation of a stereoscopic image control apparatus so as to:
   finding a desired object image portion from a left-eye image and from a right-eye image constituting a stereoscopic image using an object image detection portion using a hardware processing unit;
   shifting said left-eye image and said right-eye image in such a manner that visual disparity between the object image portion of said left-eye image and the object image portion of said right-eye image, which have been found in said object image detection portion hardware processing unit, is removed, said shifting being performed using a parallax shifting hardware processing unit;
   deciding a display area, which contains the object image portion the visual disparity of which has been removed by said parallax shifting hardware processing unit, in said left-eye image and in said right-eye image that have been shifted, said deciding being performed using a display area decision hardware processing unit;
   determining whether a forward object, representing a subject in front of the desired object portion, is contained in said left-eye image and said right-eye image, further determining whether a disparity of the forward object contained in said right-eye image and forward object contained in said left-eye image is outside an allowable range, said determining being performed by a determination hardware processing unit; and
   controlling a display so as to enlarge and display the image within the display area, which has been decided by said display area decision hardware processing unit, in said left-eye image and in said right-eye image that have been shifted by said parallax shifting hardware processing unit, and said display area is further determined based on whether a disparity of the forward object is outside the allowable range; and
   displaying the decided display area on a monitor.

6. The stereoscopic display apparatus of claim 3, wherein the display area decision hardware processing unit determines the enlargement to fill an entire display area of the monitor with the desired object portion and minimized display amount of the forward object when the disparity of the forward subject image is outside the allowable range.

* * * * *